US011442279B2

(12) United States Patent
Shin et al.

(10) Patent No.: US 11,442,279 B2
(45) Date of Patent: Sep. 13, 2022

(54) WEARABLE GLASSES-TYPE DEVICE AND METHOD FOR PROVIDING VIRTUAL IMAGES OF THE GLASSES-TYPE DEVICE

(71) Applicant: LG ELECTRONICS INC., Seoul (KR)

(72) Inventors: Seungyong Shin, Seoul (KR); Changkyu Hwang, Seoul (KR); Seungsu Yang, Seoul (KR); Hwi Kim, Sejong-si (KR); Sangyoon Kim, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/350,740

(22) Filed: Jun. 17, 2021

(65) Prior Publication Data

US 2022/0221720 A1 Jul. 14, 2022

(30) Foreign Application Priority Data

Jan. 14, 2021 (KR) ........................ 10-2021-0005319

(51) Int. Cl.
*G02B 27/01* (2006.01)
*G06T 19/00* (2011.01)

(52) U.S. Cl.
CPC ........ *G02B 27/0172* (2013.01); *G06T 19/006* (2013.01); *G02B 2027/0178* (2013.01)

(58) Field of Classification Search
CPC ........ G02B 27/0172; G02B 2027/0178; G06T 19/006
See application file for complete search history.

(56) References Cited

U.S. PATENT DOCUMENTS

| 2002/0135830 A1* | 9/2002 | Endo .................. G02B 27/0172 359/15 |
| 2006/0268421 A1* | 11/2006 | Shimizu .................. G02B 5/32 359/630 |
| 2015/0160529 A1* | 6/2015 | Popovich ................. G02B 6/34 359/200.8 |
| 2015/0260994 A1* | 9/2015 | Akutsu ..................... G02B 6/34 385/37 |
| 2017/0242252 A1* | 8/2017 | Ide ........................... H04N 5/64 |
| 2019/0011706 A1* | 1/2019 | Lee ..................... G02B 27/0101 |
| 2019/0049732 A1* | 2/2019 | Lee ..................... G02B 27/0172 |

(Continued)

FOREIGN PATENT DOCUMENTS

JP 2019-56795 A 4/2019
KR 10-2017-0139511 A 12/2017

(Continued)

*Primary Examiner* — Amit Chatly
(74) *Attorney, Agent, or Firm* — Birch, Stewart, Kolasch, & Birch, LLP

(57) ABSTRACT

A glasses-type device can include a display part configured to emit image light serving as an image source of a virtual image; a diffraction element configured to reflect and diffract the image light at a predetermined angle; and a first holographic optical element disposed on at least a portion of glass of the glasses-type device, in which the first holographic optical element is configured to cancel dispersion of the image light that is reflected and diffracted by the diffraction element, and reflect the light in which dispersion is canceled to display a virtual image corresponding to the image light.

18 Claims, 19 Drawing Sheets

(56) References Cited

U.S. PATENT DOCUMENTS

| | | | |
|---|---|---|---|
| 2019/0086673 A1* | 3/2019 | Shimizu | G02B 27/0172 |
| 2020/0192097 A1* | 6/2020 | Kim | G03H 1/0402 |
| 2021/0191125 A1* | 6/2021 | Li | G02B 27/0172 |

FOREIGN PATENT DOCUMENTS

| | | |
|---|---|---|
| KR | 10-2019-0016869 A | 2/2019 |
| KR | 10-2020-0063645 A | 6/2020 |

\* cited by examiner (a)

(b)

(c)

(a)

(b)

(a)

(b)

(a)

(b)

(c)

(d)

(a)

(b)

(a)

(b)

WEARABLE GLASSES-TYPE DEVICE AND METHOD FOR PROVIDING VIRTUAL IMAGES OF THE GLASSES-TYPE DEVICE

CROSS-REFERENCE TO RELATED APPLICATION

Pursuant to 35 U.S.C. § 119(a), this application claims the benefit of the earlier filing date and the right of priority to Korean Patent Application No. 10-2021-0005319, filed on Jan. 14, 2021, the entirety of which is incorporated by reference herein.

BACKGROUND

1. Technical Field

The present disclosure relates to a glasses-type device, and more particularly, to a glasses-type device capable of providing virtual reality (VR), augmented reality (AR), and mixed reality (MR) images.

2. Description of the Related Art

As the information age is developing rapidly, an importance of a display device that implements a realistic screen is being emphasized, and a wearable glasses-type device, such as a head mounted display (HMD) or smart glasses, is one example of the display device.

A head mounted display is mainly implemented as a safety glasses or a helmet-type device configured to view a screen in front of the eyes, and is developed to realize a sense of virtual reality. In addition, a wearable glasses-type device generally uses a method for projecting an image on a small display, such as a liquid crystal installed at a position close to both eyes. And, by an optical system using refraction of light, a focus can be formed to display image light generated from a micro-display element as a virtual image on a glass of the glasses-type device.

Since such a glasses-type device implements a screen in a see-through form through a virtual image formed on the glass, the glasses-type device can display not only virtual reality (VR) but also augmented reality (AR) or mixed reality (MR) images.

Meanwhile, a display optical system of atypical glasses-type device uses light having an extremely short wavelength, such as laser, as an image source to implement a virtual image, and has a configuration to reflect a laser image on a glass of the glasses-type device by using a micro electro mechanical system (MEMS) mirror scanner. Here, a problem of diffraction aberration due to off-axis does not occur, but since laser light is reflected on human eyes, an eye-safety problem, in which vulnerable human tissues such as eyes can be damaged, is emerging. In addition, as the MEMS mirror scanner is used, the optical system has a complicated structure and a size of the optical system is increased, and thus, it is difficult to make the glasses-type device compact.

Meanwhile, in order for a user to view a virtual image formed in the glasses-type device, the virtual image should be formed on an area corresponding to a user's eye movement. As such, a user can view an entire virtual image when the virtual image is formed within an area where the user can view the entire virtual image while moving his or her eyes, that is, an eye movement box (EMB).

However, there is a big difference in a horizontal distance between centers of pupils of both eyes (or interpupillary distance, hereinafter IPD) by individuals or race, sex or age. For example, a child and an adult have large differences in their head sizes, and such differences causes a big difference in IPD. In addition, due to a characteristic of the glasses-type device in which a body portion provided with an optical system is formed in a leg portion that is connected to a glass, such a difference in IPD changes an incident angle of light incident on the glass so that a position of a virtual image formed on the glass is changed. In addition, when the virtual image display position is changed due to the difference in IPD, it may cause a problem in which a user is disturbed from viewing a part of the virtual image.

For example, when a virtual image is formed at a point other than a center of the EMB due to the difference in IPD, a part of the virtual image can be formed outside of the EMB. In this situation, it is difficult for the user to view the part of the virtual image formed outside of the EMB, and accordingly, the user cannot view the entire virtual image.

SUMMARY

An aspect of the present disclosure is to obviate the above-mentioned problem and other drawbacks, namely, to provide a wearable glasses-type device capable of generating a virtual image without directly reflecting laser light into a user's eyes.

Another aspect of the present disclosure is to provide a glasses-type device having a more compact size by generating a virtual image by reflecting an image generated from an image source on a glass without a micro electro mechanical system (MEMS) mirror scanner.

In addition, still another aspect of the present disclosure is to provide a glasses-type device capable of solving a problem, in which a user cannot view a part of a virtual image due to a difference in interpupillary distance (IPD), by allowing the virtual image to be formed in an eye movement box (EMB) regardless of the difference in IPD.

To achieve these and other advantages and in accordance with the purpose of this specification, as embodied and broadly described herein, there is provided a glasses-type device, including a display unit to emit image light serving as an image source of a virtual image; a diffraction element that reflects and diffracts the image light at a predetermined angle; and a first holographic optical element (HOE) provided on at least a portion of a glass of the glasses-type device, and configured to cancel dispersion of the image light that is reflected and diffracted by the diffraction element, and reflect the light in which dispersion is canceled to display a virtual image corresponding to the image light.

To achieve these and other advantages and in accordance with the purpose of this specification, as embodied and broadly described herein, there is provided a glasses-type device, including a display unit to emit image light serving as an image source of a virtual image, a diffraction element that reflects and diffracts the image light at a predetermined angle, and a first holographic optical element (HOE) provided on at least a portion of a glass of the glasses-type device, and configured to negatively disperse positively dispersed light that is diffracted by the diffraction element to cancel the positive dispersion of the light and reflect the light in which dispersion is canceled to display a virtual image corresponding to the image light.

In one embodiment, the diffraction element includes a second holographic optical element that transmits light when the light is incident at an angle within a predetermined incident angle range, and reflects light when the light is incident at an angle within a predetermined reflection angle range, and a first reflection element arranged such that a reflective surface of the first reflection element faces the second holographic optical element at a predetermined angle.

In one embodiment, the display unit is disposed to face the second holographic optical element at an angle within the incident angle range, so that image light incident on the second holographic optical element transmits through the second holographic optical element, and the first reflection element is configured such that a second surface different from a first surface of the second holographic optical element to which the image light is incident is disposed to face the reflective surface at an angle within the predetermined reflection angle range, so that light transmitted through the second holographic optical element is reflected on the second surface of the second holographic optical element at an angle within the reflection angle range.

In one embodiment, the reflective surface of the first reflection element and the second surface of the second holographic optical element are disposed to face each other, so that a first light path in which light transmitted through the second holographic optical element is led to the reflective surface of the first reflection element and a light path in which light reflected from the reflective surface of the first reflection element is led to the second surface of the second holographic optical element overlap each other.

In one embodiment, the first reflection element is a full reflection mirror reflecting all incident light of all wavelengths.

In one embodiment, the first reflection element is a half reflection mirror in which reflection of light is partially limited so that a transmission ratio and a reflection ratio of incident light having an unspecified wavelength have a predetermined ratio within a predetermined range.

In one embodiment, the display unit includes an optical module including at least one light source that emits image light, and a lens unit including at least one lens for magnifying the light emitted from the at least one light source and converting the light into parallel light.

In one embodiment, the at least one light source is a self-luminous light source or an illumination type light source including at least one of a micro light emitting diode (LED), a micro organic LED (OLED), a liquid crystal on silicon (LCoS), or a digital micromirror device (DMD) with LED or SLD.

In one embodiment, the first reflection element is a holographic optical element arranged such that the light transmitted through the second holographic optical element is incident at an angle within the predetermined reflection angle range.

In one embodiment, the glasses-type device further includes a tilting portion configured to rotate the first reflection element by a predetermined angle to change an angle at which the reflective surface faces the second holographic optical element.

In one embodiment, a position of the virtual image formed on a glass is moved in a direction towards a glabella of a user when the first reflection element is rotated to increase an incident angle of light incident on the second surface of the second holographic optical element, and is moved in a direction towards a temple of the user when the first reflection element is rotated to decrease the incident angle of light incident on the second surface of the second holographic optical element.

In one embodiment, the tilting portion further includes an actuator to provide a rotational force for rotating the first reflection element by a predetermined angle, and the glasses-type device further includes a sensor unit to measure a distance between centers of pupils of both eyes, and a controller to determine a rotation angle of the first reflection element at an angle corresponding to the distance measured by the sensor unit to control the actuator to rotate the first reflection element according to the determined rotation angle.

In one embodiment, the sensor unit is at least one camera provided in a glass frame supporting glasses corresponding to both eyes of a user, and the controller calculates a distance between centers of pupils of both eyes based on positions of the pupils of both eyes of the user obtained by the camera.

In one embodiment, the sensor unit includes at least one sensor to measure an angle between a body portion of the glasses-type device provided with the display unit and a glass frame supporting glasses corresponding to both eyes of a user, and the controller estimates a distance between centers of pupils of the both eyes based on the measured angle between the body portion and the glass frame.

In one embodiment, the glasses-type device further includes a tilting portion to rotate the display unit by a predetermined angle to change an angle at which the display unit faces the diffraction element.

In one embodiment, a position of the virtual image formed on a glass is moved in a direction towards a glabella of a user when an angle at which the display unit faces the diffraction element is changed to increase incident angle of light incident on the diffraction element, and is moved in a direction towards a temple of the user when the angle at which the display unit faces the diffraction element is changed to decrease incident angle of light incident on the diffraction element.

To achieve these and other advantages and in accordance with the purpose of this specification, as embodied and broadly described herein, there is provided a method for providing a virtual image of a glasses-type device, the method including steps of emitting image light serving as an image source of the virtual image from at least one light source, magnifying and converting the image light emitted from the light source into parallel light by at least one lens, reflecting and diffracting the image light at a predetermined angle by a diffraction element, and negatively dispersing positively dispersed light that is diffracted by the diffraction element, so as to cancel the positive dispersion of the light by a first holographic optical element provided on at least a portion of a glass of the glasses-type device, and reflecting the light in which dispersion is canceled to display the virtual image corresponding to the image light on the at least a portion of the glass.

In one embodiment, the diffraction element includes a second holographic optical element that transmits light when the light is incident at an angle within a predetermined incident angle range, and reflects light when the light is incident at an angle within a predetermined reflection angle range, and a first reflection element arranged such that a reflective surface of the first reflection element faces the second holographic optical element at a predetermined angle.

In one embodiment, the step of reflecting and diffracting the image light by the diffraction element includes steps of transmitting the parallel light incident at an angle within the incident angle range through the second holographic optical element, reflecting the light transmitted through the second holographic optical element on the first reflection element at an angle within the reflection angle range, and reflecting the light reflected from the first reflection element towards the first holographic optical element by the second holographic optical element, and wherein the reflected light is reflected and diffracted by the second holographic optical element so as to be positively dispersed.

In one embodiment, the step of reflecting and diffracting the image light by the diffraction element further includes rotating a direction in which the at least one light source or the diffraction element is facing by a predetermined angle, and wherein a position of the virtual image formed on the glass is changed as the direction in which the at least one light source or the diffraction element is facing is changed.

Hereinafter, effects of a glasses-type device and a method for providing virtual images of the glasses-type device according to the present disclosure will be described.

According to at least one of embodiments of the present disclosure, the present disclosure can generate a virtual image by using a light source having a longer wavelength than that of a typical laser light source and cancel negative dispersion phenomenon caused by long wavelength light by using a holographic element to thereby generate a virtual image on a glass without having to use a short wavelength laser light. Accordingly, the present disclosure has an effect of solving an eye-safety problem due to a short wavelength laser light and an effect of providing a more compact glasses-type device by reducing a size of an optical system, as a micro electro mechanical system (MEMS) mirror scanner to reflect short wavelength laser light is not provided.

In addition, according to at least one of the embodiments of the present disclosure, the present disclosure has an effect of allowing a user to view an entire virtual image regardless of differences in IPD by adjusting a reflection angle of a mirror that reflects light transmitted through a holographic element so that a virtual image formed on a glass is always formed within an eye movement box (EMB).

DETAILED DESCRIPTION OF THE EMBODIMENTS

Figure 1A:
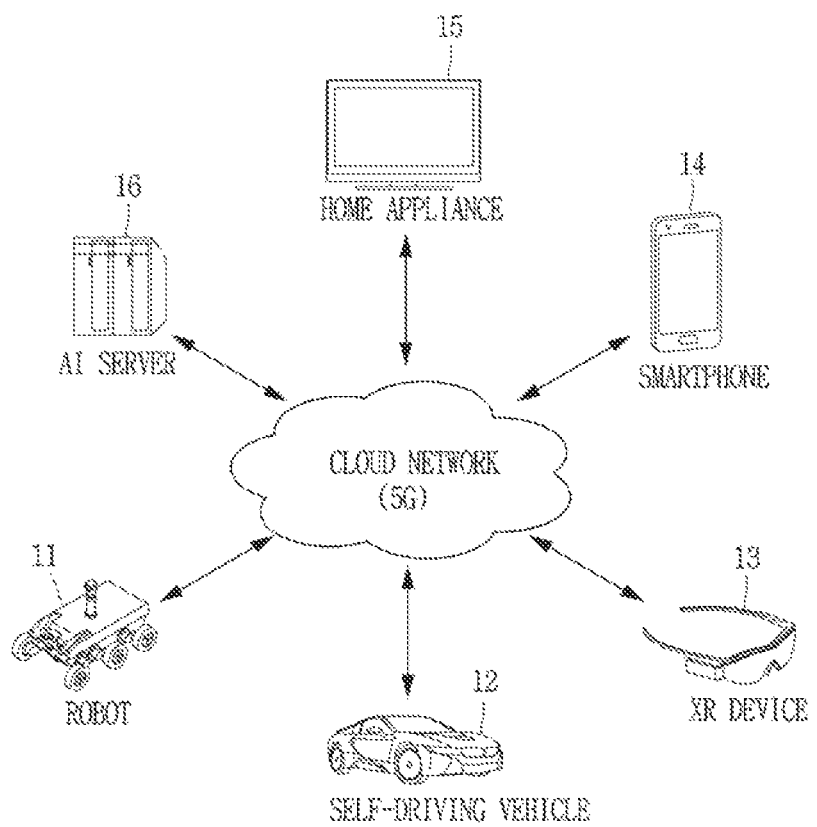
FIG. 1A is a conceptual view illustrating an AI device according to an embodiment of the present disclosure.

It is noted that the technical terms used herein are used only to describe specific embodiments and are not intended to limit the disclosure. In addition, a singular representation can include a plural representation unless it represents a definitely different meaning from the context. In general, a suffix such as "module" and "unit" can be used to refer to elements or components. Use of such a suffix herein is merely intended to facilitate description of the specification, and the suffix itself is not intended to give any special meaning or function.

In this specification, the terms "comprising" and "including" should not be construed to necessarily include all of the elements or steps disclosed herein, and should be construed not to include some of the elements or steps thereof, or should be construed to further include additional elements or steps.

In describing the present disclosure, when a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings. In addition, each of the embodiments described below, as well as combinations of the embodiments, are modifications, equivalents, and alternatives included in the spirit and scope of the disclosure, and can fall within the spirit and scope of the present disclosure.

Meanwhile, the glasses-type device disclosed herein can be configured to interwork with nearby devices. As an example, the glasses-type device can be configured to display content owned by a user or content received from a nearby device. As another example, the glasses-type device can be configured to display content received by interworking with a nearby device or server through a cloud network. In this regard, the glasses-type device can be configured to display content received by interworking with a nearby device or server through 5G communication.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case can require a plurality of areas for optimization, but other use case can focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system. Primary causes of increased volume of traffic are increase of content size and increase of the number of applications requiring a high data transfer rate. Streaming service (audio and video), interactive video, and mobile Internet connection will be more heavily used as more and more devices are connected to the Internet.

These application programs require always-on connectivity to push real-time information and notifications to the user. Cloud-based storage and applications are growing rapidly in the mobile communication platforms, which can be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which can transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G can complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs can require a special network configuration. For example, in the case of VR game, to minimize latency, game service providers can have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian).

A safety system guides alternative courses of driving so that a driver can drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors can identify conditions for cost-efficient and energy-efficient conditions for maintaining cities and homes. A similar configuration can be applied for each home. Temperature sensors, window and heating controllers, anti-theft alarm devices, and home appliances will be all connected wirelessly. Many of these sensors typified with a low data transfer rate, low power, and low cost. However, for example, real-time HD video can require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information can include behaviors of energy suppliers and consumers, the smart grid can help improving distribution of fuels such as electricity in terms of efficiency, reliability, economics, production sustainability, and automation. The smart grid can be regarded as a different type of sensor network with a low latency.

The health-care sector has many application programs that can benefit from mobile communication. A communication system can support telemedicine providing a clinical care from a distance. Telemedicine can help reduce barriers to distance and improve access to medical services that are not readily available in remote rural areas. It can also be used to save lives in critical medical and emergency situations. A wireless sensor network based on mobile communication can provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below can be implemented by combining or modifying the respective embodiments to satisfy the aforementioned requirements of the 5G system.

FIG. 1A illustrates one embodiment of an AI device.

Referring to FIG. 1A, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied can be referred to as an AI device (11 to 15).

The cloud network 10 can comprise part of the cloud computing infrastructure or refer to a network existing in the cloud computing infrastructure. Here, the cloud network 10 can be constructed by using the 3G network, 4G or Long Term Evolution (LTE) network, or 5G network.

In other words, individual devices (11 to 16) constituting the AI system can be connected to each other through the cloud network 10. In particular, each individual device (11 to 16) can communicate with each other through the eNB but can communicate directly to each other without relying on the eNB.

The AI server 16 can include a server performing AI processing and a server performing computations on big data.

The AI server 16 can be connected to at least one or more of the robot 11, self-driving vehicle 12, XR device 13, smartphone 14, or home appliance 15, which are AI devices constituting the AI system, through the cloud network 10 and can help at least part of AI processing conducted in the connected AI devices (11 to 15).

At this time, the AI server 16 can teach the artificial neural network according to a machine learning algorithm on behalf of the AI device (11 to 15), directly store the learning model, or transmit the learning model to the AI device (11 to 15).

At this time, the AI server 16 can receive input data from the AI device (11 to 15), infer a result value from the received input data by using the learning model, generate a response or control command based on the inferred result value, and transmit the generated response or control command to the AI device (11 to 15).

Similarly, the AI device (11 to 15) can infer a result value from the input data by employing the learning model directly and generate a response or control command based on the inferred result value.

<AI+XR>

By employing the AI technology, the XR device 13 can be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 can obtain information about the surroundings or physical objects by generating position and attribute data about 3D points by analyzing 3D point cloud or image data acquired from various sensors or external devices and output objects in the form of XR objects by rendering the objects for display. For example, the XR device 13 may output XR objects including additional information about recognized physical objects by corresponding the XR objects to the recognized physical objects.

The XR device 13 may perform the operations above by using a learning model built on at least one artificial neural network. For example, the XR device 13 can recognize physical objects from 3D point cloud or image data by using the learning model and provide information corresponding to the recognized physical objects. Here, the learning model can be the one trained by the XR device 13 itself or trained by an external device such as the AI server 16.

At this time, the XR device 13 can perform the operation by generating a result by employing the learning model directly but also perform the operation by transmitting sensor information to an external device such as the AI server 16 and receiving a result generated accordingly.

<AI+Robot+XR>

By employing the AI technology, the robot 11 can be implemented as a guide robot, transport robot, cleaning robot, wearable robot, entertainment robot, pet robot, or unmanned flying robot.

The robot 11 employing the XR technology can correspond to a robot which acts as a control/interaction target in the XR image. In this situation, the robot 11 can be distinguished from the XR device 13, both of which can operate in conjunction with each other.

If the robot 11, which acts as a control/interaction target in the XR image, obtains sensor information from the sensors including a camera, the robot 11 or XR device 13 can generate an XR image based on the sensor information, and the XR device 13 can output the generated XR image. And the robot 11 can operate based on the control signal received through the XR device 13 or based on the interaction with the user.

For example, the user can check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 can be implemented as a mobile robot, unmanned ground vehicle, or unmanned aerial vehicle.

The self-driving vehicle 12 employing the XR technology can correspond to a self-driving vehicle having a means for providing XR images or a self-driving vehicle which acts as a control/interaction target in the XR image. In particular, the self-driving vehicle 12 which acts as a control/interaction target in the XR image can be distinguished from the XR device 13, both of which can operate in conjunction with each other.

The self-driving vehicle 12 having a means for providing XR images can obtain sensor information from sensors including a camera and output XR images generated based on the sensor information obtained. For example, by displaying an XR image through HUD, the self-driving vehicle 12 can provide XR images corresponding to physical objects or image objects to the passenger.

At this time, if an XR object is output on the HUD, at least part of the XR object can be output to be overlapped with the physical object at which the passenger gazes. On the other hand, if an XR object is output on a display installed inside the self-driving vehicle 12, at least part of the XR object can be output to be overlapped with an image object. For example, the self-driving vehicle 12 can output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 can generate an XR image based on the sensor information, and the XR device 13 can output the generated XR image. And the self-driving vehicle 12 can operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology can be applied to Head-Mounted Display (HMD), Head-Up Display (HUD), mobile phone, tablet PC, laptop computer, desktop computer, TV, digital signage, and so on, where a device employing the XR technology can be called an XR device.

Figure 1B:
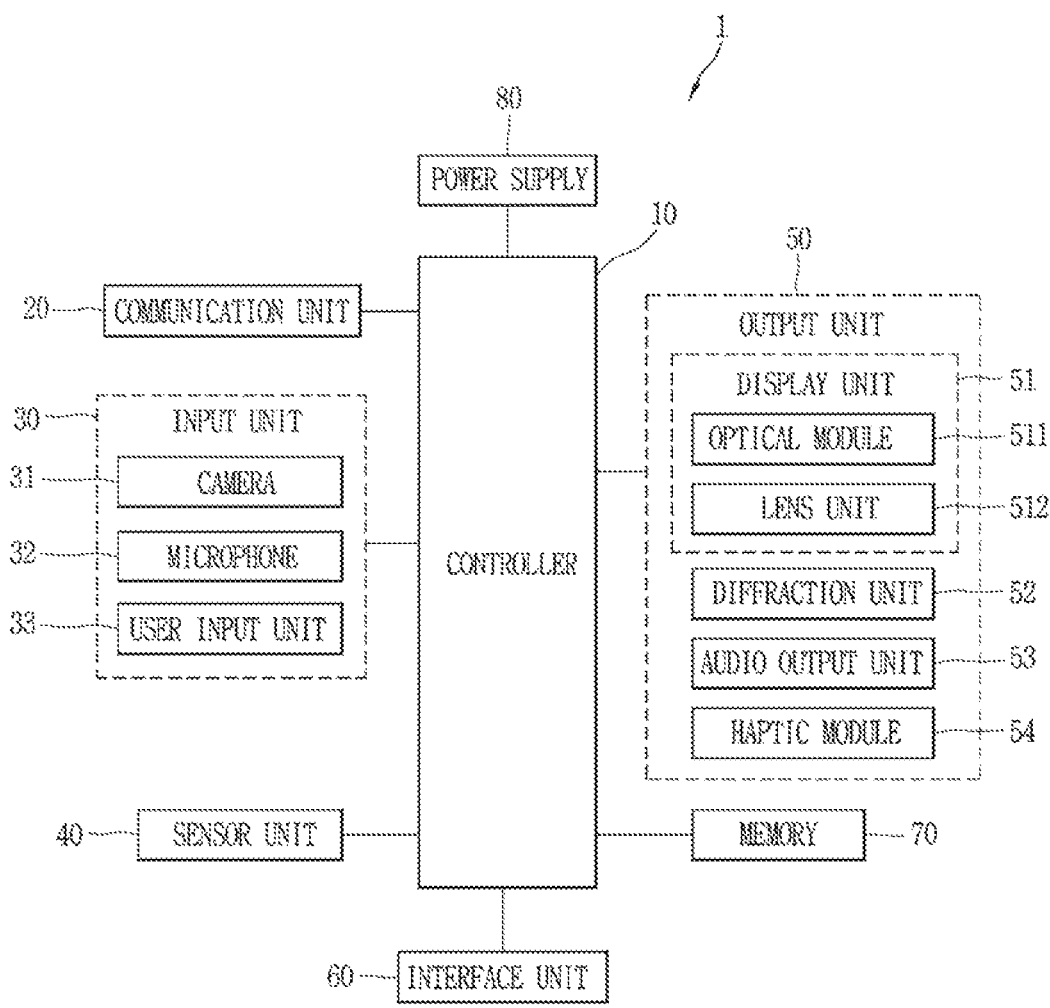
FIG. 1B is a block diagram illustrating a configuration of a glasses-type device according to an embodiment of the present disclosure.

FIG. 1B is a block diagram illustrating a configuration of a glasses-type device 100 in accordance with the present disclosure.

The glasses-type device 100 according to the present disclosure can be shown having components such as a communication unit 20, an input unit 30, a sensor unit 40, an output unit 50, an interface unit 60, a memory 70, a controller 10, and a power supply 80. FIG. 1B shows the glasses-type device 100 having various components, but it can be understood that implementing all of the illustrated components is not a requirement. Greater or fewer components can alternatively be implemented.

In more detail, the communication unit 20 can include at least one module which permits wireless communications between the glasses-type device 100 and a wireless communication system, wireless communications between the glasses-type device 100 and another device, or wireless communications between the glasses-type device 100 and an external server. Further, the communication unit 20 can typically include one or more modules which connect the glasses-type device 100 to one or more networks. The communication unit 20 can include one or more of a broadcast receiving module, a mobile communication module, a wireless Internet module, a short-range communication module, and a location information module.

The input unit 30 can include a camera 31 or an image input unit for obtaining images or video, a microphone 32, which is one type of audio input device for inputting an audio signal, and a user input unit 33 (for example, a touch key, a mechanical key, and the like) for allowing a user to input information. Data (for example, audio, video, image, and the like) obtained by the input unit 30 can be analyzed to be processed according to user's command.

The camera 31 is provided at least one and is disposed adjacent to at least one of the left eye and the right eye, to capture (take, photograph) an image of a front side. Since the camera 31 is disposed adjacent to the eye, the camera 121 can acquire a scene viewed by the user as an image. In addition, the camera 31 can be provided in a glass frame supporting a glass to obtain an image on an inner side of the glass. Here, the camera 31 can obtain information about both eyes of a user, namely, sizes of both eyes or a position of each pupil, from the image on the inner side of the glass.

The sensor unit 40 can include at least one sensor to sense at least one among information about the glasses-type device 100 itself, information about surrounding environment of the glasses-type device 100, information about the user, or the like. For example, the sensor unit 40 can include at least one among a proximity sensor 141, an illumination sensor 142, a touch sensor, an acceleration sensor, a magnetic sensor, a G-sensor, a gyroscope sensor, a motion sensor, a red, green, and blue (RGB) sensor, an infrared (IR) sensor, a finger scan sensor, a ultrasonic sensor, an optical sensor (for example, camera 31), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The glasses-type device 100 disclosed herein can be configured to utilize information obtained from two or more sensors among these sensors, and combinations thereof.

The output unit 50 can typically be configured to output various types of information, such as audio, video, tactile output, and the like. The output unit 50 can include at least one among a display unit 51, an audio output module 53, and a haptic module 54. Further, the output unit 50 can further include an optical output unit for outputting an optical signal.

Here, the display unit 51 can include an optical module 511 including at least one light source that emits light for generating a virtual image as an image source. The optical module 511 can include various light sources. For example, the optical module 511 can use a micro light emitting diode (LED), a micro organic LED (OLED), or a liquid crystal on silicon (LCoS) that emits light having an emission wavelength wider than that of a laser diode, instead of using a laser display using a laser diode. Alternatively, a digital micromirror device (DMD) with LED or super luminescent diode (SLD) can be included as an image source.

In addition, the display unit 51 can include a lens unit 512 including at least one lens for magnifying and converting light emitted from the optical module 511 into parallel light. The lens included in the lens unit 512 can be at least one among a concave lens, a convex lens, and a collimating lens. The concave lens and the convex lens can be used to disperse and magnify light emitted from the optical module 511, and the collimating lens can be used to convert light dispersed and magnified by the concave lens and the convex lens into parallel light.

Meanwhile, the glasses-type device 100 according to the embodiment of the present disclosure can further include a diffraction unit 52 that forms a light path in which light emitted from the display unit 51 is led to an eye movement box (EMB) formed on the glass of the glasses-type device 100. For example, when the output unit 50 is provided in a body portion formed at a leg portion of the glasses-type device 100, the diffraction unit 52 can form a light path allowing light to be projected from a part of the body portion onto the glass.

The diffraction unit 52 can include at least one diffraction element. The diffraction unit 52 can include a refraction element that refracts light, emitted from the display unit 51, in a specific direction.

In addition, the glass can include a reflection element 301 to form the EMB on at least a part of the glass. Here, the light emitted from the display unit 51 is refracted through the refraction element to be projected to the reflection element 301, and the projected light is reflected from the reflection element 301, so that a virtual image that can be identified by a user is formed on the reflection element 301.

Here, the reflection element 301 provided on the glass can be implemented as a holographic optical element (HOE). The holographic optical element 301 can be configured to transmit light incident at an angle within a predetermined incident angle range and configured to reflect light incident at an angle out of the predetermined incident angle range. Here, as the holographic optical element 301 transmits light incident in a direction perpendicular to a user's pupil and reflects light refracted through the refraction element, a see-through type virtual image can be formed on the glass.

Meanwhile, the refraction element can be implemented as one refraction element to refract light emitted from the display unit 51, or implemented as a plurality of reflection elements. Here, the plurality of reflection elements can form a light path in which light emitted from the display unit 51, namely, the lens unit 512, is led to the holographic optical element 301. To this end, a first reflection element 303 among the plurality of reflection elements can be configured to reflect light emitted from the display unit 51, and a second reflection element 302 which is different from the first reflection element 303 can be disposed to reflect light reflected from the first reflection element 303 to the holographic optical element 301.

Meanwhile, as described above, the holographic optical element 301 has a characteristic of transmitting light incident at an angle within a predetermined incident angle range and reflecting light incident at an angle out of the predetermined incident angle range. Therefore, when the second reflection element 302 is implemented as a holographic optical element and disposed between the first reflection element 303 and the display unit 51, light emitted from the display unit 51 can pass through the second reflection element 302 to be incident on the first reflection element 303 and the light incident on the first reflection element 303 can be reflected by the first reflection element 303 to be reflected to the second reflection element 302, by adjusting incident angle of light.

This can allow a first path in which light is incident from the display unit 51 to the first reflection element 303 to overlap with a second path in which light reflected by the first reflection element 303 is incident on the second reflection element 302, thereby further reducing a size of the diffraction unit 52.

In the following description, in order to distinguish the holographic optical element 301 formed on the glass from the holographic optical element used as the second reflection element 302, the former, namely, the holographic optical element 301 formed on the glass will be referred to as a first holographic optical element (or first HOE) 301, and the latter, namely, the holographic optical element used as the second reflection element 302 will be referred to as a second holographic optical element (or second HOE) 302.

Meanwhile, the interface unit 60 serves as an interface with various types of external devices to be connected to the glasses-type device 100. The interface unit 60, for example, can include any of wired or wireless headset ports, external power supply ports, wired or wireless data ports, memory card ports, ports for connecting a device having an identification module, audio input/output (I/O) ports, video I/O ports, earphone ports, and the likes. In some cases, the glasses-type device 100 can perform assorted control functions associated with a connected external device, in response to the external device being connected to the interface unit 60.

Meanwhile, the audio output module 53 can receive audio data from the communication unit 20 or output audio data stored in the memory 170 during modes such as a signal reception mode, a call mode, a record mode, a voice recognition mode, a broadcast reception mode, and the like. The audio output module 53 can output audio signals related to functions performed by the glasses-type device 100. The audio output module 53 can also be implemented as a receiver, a speaker, a buzzer, or the like.

The audio output module 53 can be configured to transmit audio in a general audio outputting manner or in a bone-conduction manner. In a situation where the audio output module 53 transmits audio in the bone-conduction manner, when a user wears the glasses-type device 100, the audio output module 53 is brought into close contact with a head of the user and vibrates a skull to transmit audio.

The haptic module 54 can generate various tactile effects that a user feels, perceives, or otherwise experiences. A typical example of a tactile effect generated by the haptic module 54 is a vibration. The strength, pattern and the like of the vibration generated by the haptic module 54 can be controlled by user's selection or controller's setting. In addition, the haptic module 54 can output different vibrations by synthesizing them together or sequentially output different vibrations, and at least two haptic modules 54 can be provided depending on a configuration aspect of the glasses-type device 100.

The interface unit 60 serves as an interface with external devices to be connected to the glasses-type device 100. For example, the interface unit 60 can receive data transmitted from an external device, receive and transfer power to elements and components within the glasses-type device 100, or transmit internal data of the glasses-type device 100 to such external device. The interface unit 60 can include wired or wireless headset ports, external power supply ports, wired or wireless data ports, memory card ports, ports for connecting a device having an identification module, audio input/output (I/O) ports, video I/O ports, earphone ports, or the like.

The memory 70 can store programs to support operations of the controller 10 and store input/output data (for example, phonebook, messages, still images, videos, etc.). The memory 70 can store data related to various patterns of vibration and audio which are outputted through the haptic module 54 or the audio output module 53.

Meanwhile, the controller 10 controls an overall operation of the glasses-type device 100, in addition to operations associated with the application programs. For example, the controller 10 can set or release a lock state for restricting a user from inputting a control command with respect to applications when a status of the glasses-type device 100 meets a preset condition.

In addition, the controller 10 can perform control and processing related to voice calls, data communication, video calls, and others. In addition, the controller 10 can control one or a combination of those components in order to implement various exemplary embodiments disclosed herein on the glasses-type device 100 according to the present disclosure.

The power supply 80 receives external power or provides internal power and supply the appropriate power required for operating respective elements and components included in the glasses-type device 100 under the control of the controller 10. The power supply 80 can include a battery, which is typically rechargeable, or can be detachably coupled to the device body for charging. In addition, the battery can be charged with power of an external charger through a connection port, or charged by an external wireless power transmitter in an inductive coupling method based on a magnetic induction phenomenon or an electromagnetic resonance phenomenon.

Figure 2:
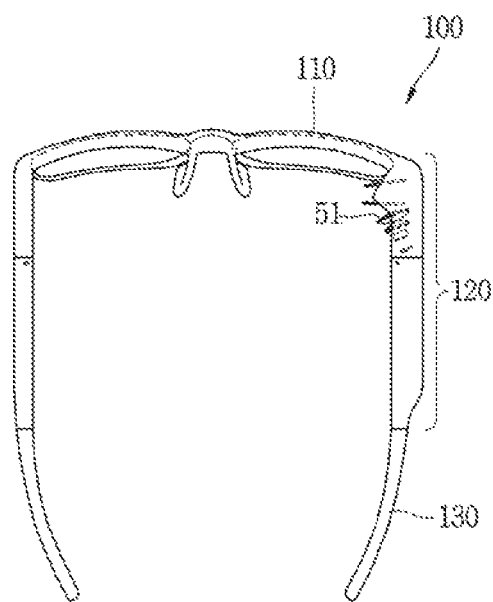
FIG. 2 is a configuration diagram illustrating a glasses-type device and an internal structure of a display unit and a diffraction unit provided in a body portion according to an embodiment of the present disclosure.
Figure 2:
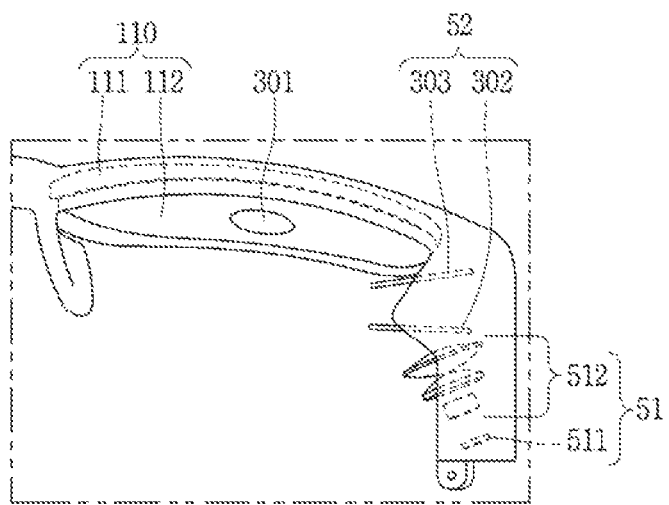
Figure 2:
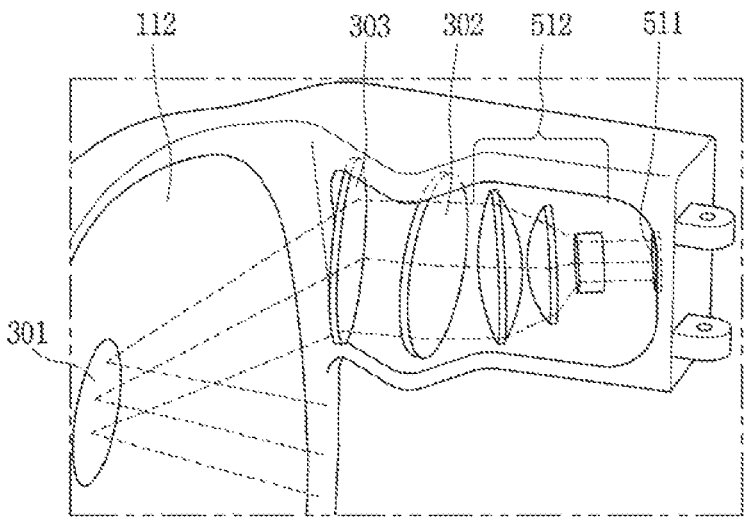

FIG. 2 is a configuration diagram illustrating the glasses-type device 100 and an internal structure of the display unit 51 and the diffraction unit 52 provided in the body portion according to the present disclosure.

First, (a) of FIG. 2 illustrates the glasses-type device 100 according to the embodiment of the present disclosure.

The glasses-type device 100 can be configured to be wearable on a head of a human body (or a head, a face, etc.), and include a frame (a case, a housing, etc.) for wearing. The frame can be formed of a flexible material to facilitate wearing. The frame can include a first frame portion 110 supporting each glass and a second frame portion 130 supporting a main body of the glasses-type device.

First, the second frame portion 130 can include the leg portion of the glasses-type device 100, and can have a space to be provided with a body portion 120 which is supported by a head of a human body and in which various components are mounted. In addition, the body portion 120 can be mounted in a space provided in the second frame portion 130.

Meanwhile, the first frame portion 110 can include a glass 112 including a lens to cover a left eye or a right eye, and a glass frame 111 to support and fix the glass 112. The glass 112 can be detachably mounted to the glass frame 111.

Meanwhile, various electronic components provided in the body portion 120 can be electronic components corresponding to the respective components illustrated in FIG. 1B. Therefore, the body portion 120 can include not only the controller 10, and the communication unit 20, the input unit 30, the sensor unit 40, and the memory 70 connected to the controller 10, but also the output unit 50. Here, the display unit 51 and the diffraction unit 52 configured to output light for displaying a virtual image on the glass 112 can be provided in the body portion 120, and a light path in which light is projected on the glass adjacent to the display unit 51 through the diffraction unit 52 can be formed by the body portion 120.

(b) and (c) of FIG. 2 are example views explaining a configuration of the display unit 51 and the diffraction unit 52 provided in the body portion 120.

Referring to (b) and (c) of FIG. 2, the display unit 51 including a light source that emits an image source, that is, the optical module 511, and the lens unit 512 including a plurality of lenses is disclosed. And, a configuration of the diffraction unit 52 including the first reflection element 303, the second reflection element 302, and the first holographic optical element 301 is disclosed.

Referring to the drawings, in the glasses-type device 100 according to the embodiment of the present disclosure, the first holographic optical element 301 can be provided in one area of the glass 112. Here, the one area of the glass 112 provided with the first holographic optical element 301 is an area in which light projected through the diffraction unit 52 is reflected to display a virtual image. And, the one area can form an area where a user can visually view the virtual image, namely, the eye movement box (EMB).

Meanwhile, in the glasses-type device 100 according to the embodiment of the present disclosure, the first reflection element 303 and the second reflection element 302 can be disposed between the lens unit 512 of the display unit 51 and the first hologram element 301 as illustrated in (b) and (c) of FIG. 2.

Here, the second reflection element 302 can be the holographic optical element (or the second holographic optical element) as described above. Accordingly, in the following description, it is assumed that the second reflection element 302 is the second holographic optical element.

Meanwhile, the first reflection element 303 can be a full reflection mirror reflecting all wavelengths or a half reflection mirror only reflecting light having a predetermined wavelength by using a filter. In this regard, the half reflection mirror can be configured not to have wavelength selectivity. The half reflection mirror can be a half transmission mirror that partially restricts reflection of light such that a transmission ratio and a reflection ratio of the incident light have a predetermined ratio within a predetermined range. According to another example, the half reflection mirror can be configured to partially reflect light within a predetermined wavelength range.

When the first reflection element 303 is implemented as the half reflection mirror, the first reflective element 303 can reflect only light of a predetermined wavelength to the second holographic optical element 302 at a predetermined ratio. Accordingly, light corresponding to noise generated during a process of magnifying and converting light performed by the lens unit 512, namely, optical noise may not be reflected by the first reflection element 303, according to the embodiment. Therefore, a virtual image according to light from an image source from which optical noise has been removed can be displayed on the first holographic optical element 301.

However, in a situation where the first reflection element 303 is implemented as a half reflection mirror, only light having a predetermined wavelength can be reflected. Therefore, according to an embodiment, there is an advantage that optical noise can be removed when light within a predetermined wavelength range is reflected, but there can be a minute optical error between each light having different wavelengths, such as a quantization error. Accordingly, the first reflection element 303 can be implemented as a half transmission mirror not having wavelength selectivity but having a predetermined ratio in which the transmission ratio and reflection ratio of light are within a predetermined range.

On the other hand, when the first reflection element 303 is implemented as a full reflection mirror, incident light of all wavelengths is reflected to the second holographic optical element 302. Accordingly, a virtual image according to the light emitted from the image source as it is, can be displayed on the first holographic optical element 301. Therefore, an optical error may not occur, but since light of all wavelengths is reflected due to the characteristics of the full reflection mirror, optical noise generated during the process of magnifying and converting light in the lens unit 512 can be included in the virtual image.

Figure 3:
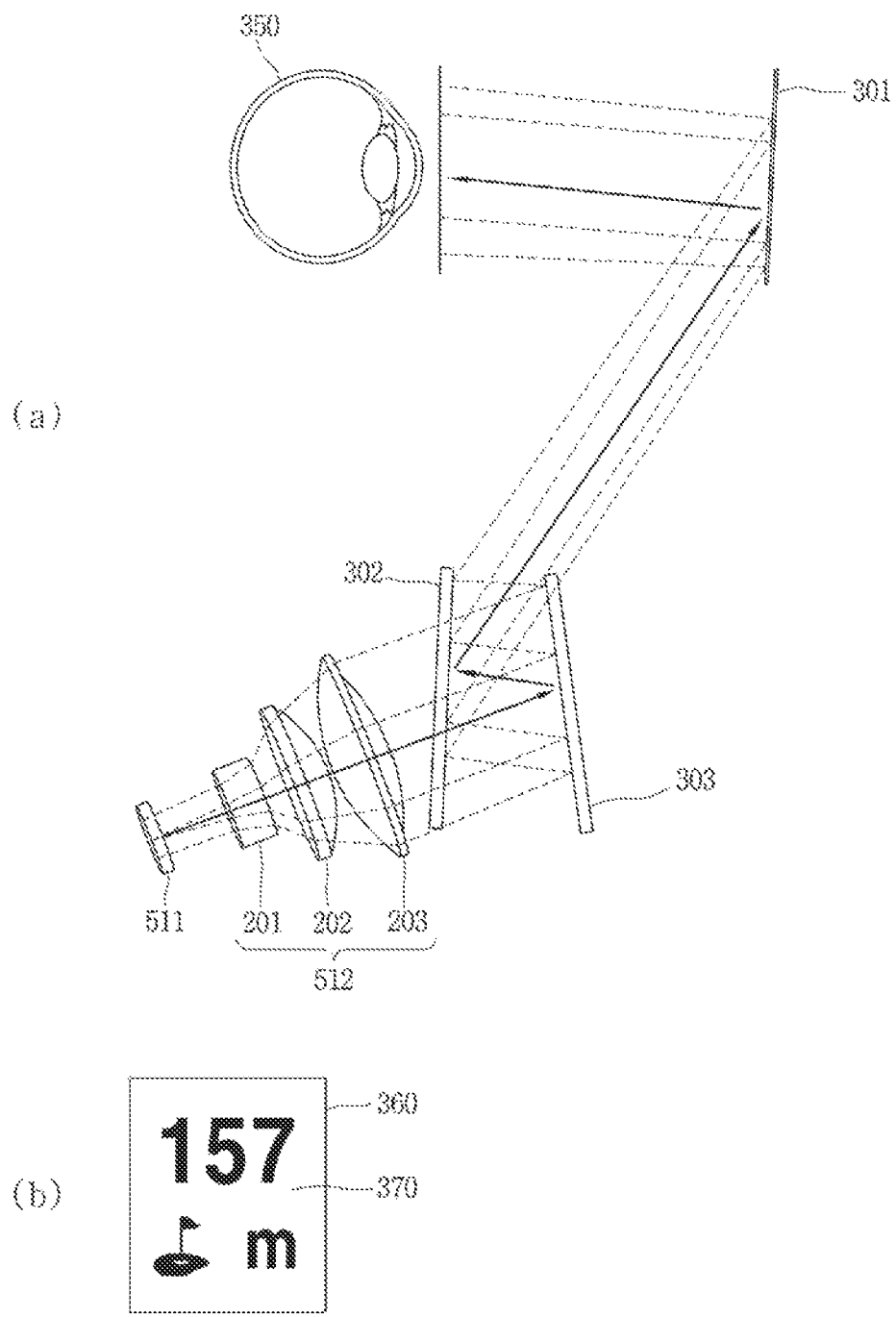
FIG. 3 is a conceptual view illustrating an optical system by which a virtual image from light of an image source is displayed, in a glasses-type device according to an embodiment of the present disclosure.

FIG. 3 is a conceptual view illustrating an optical system by which a virtual image from light of an image source is displayed, in the glasses-type device 100 according to the present disclosure.

Referring to (a) of FIG. 3, the display unit 51 of the glasses-type device 100 according to the embodiment of the present disclosure can include the optical module 511 and the lens unit 512 including a plurality of lenses. Here, the optical module 511 is a light source having a wavelength longer than a wavelength of laser light, and can include a self-luminous light source or an illumination type light source such as an LED as an image source.

In addition, the lens unit 512 can include at least one concave lens 201, a convex lens 202, and a collimating lens 203. Here, the convex lens 202 can be a plano-convex lens with one flat surface. The concave lens 201, the convex lens 202, and the collimating lens 203 can be arranged in order along an optical axis of light emitted from the optical module 511 as illustrated in (a) of FIG. 3.

In addition, as illustrated in (a) of FIG. 3, the first reflection element 303 and the second holographic optical element 302 can be disposed to face each other. Here, a surface of the second holographic optical element 302 facing the lens unit 512 is referred to as a first surface, and a surface of the second holographic optical element 302 facing a reflective surface of the first reflection element 303 is referred to as a second surface.

Meanwhile, the light emitted from the optical module 511 can be dispersed through the concave lens 201, and the light dispersed through the concave lens 201 may be magnified by the convex lens 202. In addition, the light magnified by the convex lens 202 may be converted into parallel light by the collimating lens 203 to be incident on the first surface of the second holographic optical element 302.

Here, the parallel light converted by the collimating lens 203 can be incident on the first surface of the second holographic optical element 302 at an angle within a predetermined incident angle range. Therefore, as illustrated in (a) of FIG. 3, the parallel light can transmit through the second holographic optical element 302, and the transmitted light can be incident on the first reflection element 303.

Meanwhile, the first reflection element 303 can reflect the transmitted light at a reflection angle corresponding to an incident angle of the transmitted light. Here, as illustrated in (a) of FIG. 3, the reflective surface of the first reflection element 303 is disposed to face the second surface of the second holographic optical element 302. Accordingly, reflected light reflected from the first reflection element 303 can be incident on the second surface of the second holographic optical element 302. Here, since the reflected light is incident at an angle out of a predetermined incident angle range, the reflected light may not be transmitted but can be reflected from the second surface of the second holographic optical element 302.

Meanwhile, the second holographic optical element 302 can be a holographic optical element that reflects and diffracts predesigned incident light at a specific angle. Accordingly, the reflected light reflected from the first reflection element 303 can be diffracted from the second surface of the second holographic optical element 302, and the light dispersed by diffraction can be reflected at a predetermined angle. Here, the light dispersed by the diffraction can be light dispersed with a constant wavelength. Here, the expression "reflecting and diffracting incident light at a specific angle" means that incident light is reflected and diffracted at a specific angle. For example, the expression means that the incident light is reflected from a first plane surface at a first angle, and then the reflected light is diffracted at a second angle on a second plane surface.

Meanwhile, light diffracted and reflected from the second surface of the second holographic optical element 302 can be led to the first holographic optical element 301. Here, the first holographic optical element 301, like the second holographic optical element 302, can be a holographic optical element that reflects and diffracts at a specific angle by predesigned incident light. Accordingly, when the reflected light is incident on the first holographic optical element 301 at an angle out of the predetermined incident angle range, namely, an incident angle range in which light is transmitted, the incident light can be reflected and diffracted from the first holographic optical element 301.

Meanwhile, the light diffracted by the second holographic optical element 302 generates positive dispersion. Accordingly, the light reflected by the second holographic optical element 302 can be led to the first holographic optical element 301 in a state in which the positive dispersion is generated. With this reason, the first holographic optical element 301 can be an optical element that negatively disperses the incident light in order to cancel the dispersion (or positive dispersion) of the light. In other words, the first holographic optical element 301 can be an optical element that negatively disperses incident light by diffraction and reflects the negatively dispersed light.

The "positive dispersion" refers to a phenomenon in which long wavelength light incident on the HOE by a display (or a light source) with a wide wavelength shows a greater angle of refraction and short wavelength light shows a smaller angle of refraction. On the other hand, the "negative dispersion" refers to a phenomenon in which long wavelength light incident on the HOE by a display (or a light source) with a wide wavelength shows a smaller angle of refraction and short wavelength light shows a greater angle of refraction. Due to this negative dispersion, resolution can be deteriorated.

Light diffracted (or negatively dispersed) and reflected by the first holographic optical element 301 can enter the pupil of the user. Therefore, a virtual image 370 corresponding to the reflected light that has reached the first holographic optical element 301 can be formed in the one area (EMB, 360) on the glass 112 as shown in (b) of FIG. 3.

Figure 4:
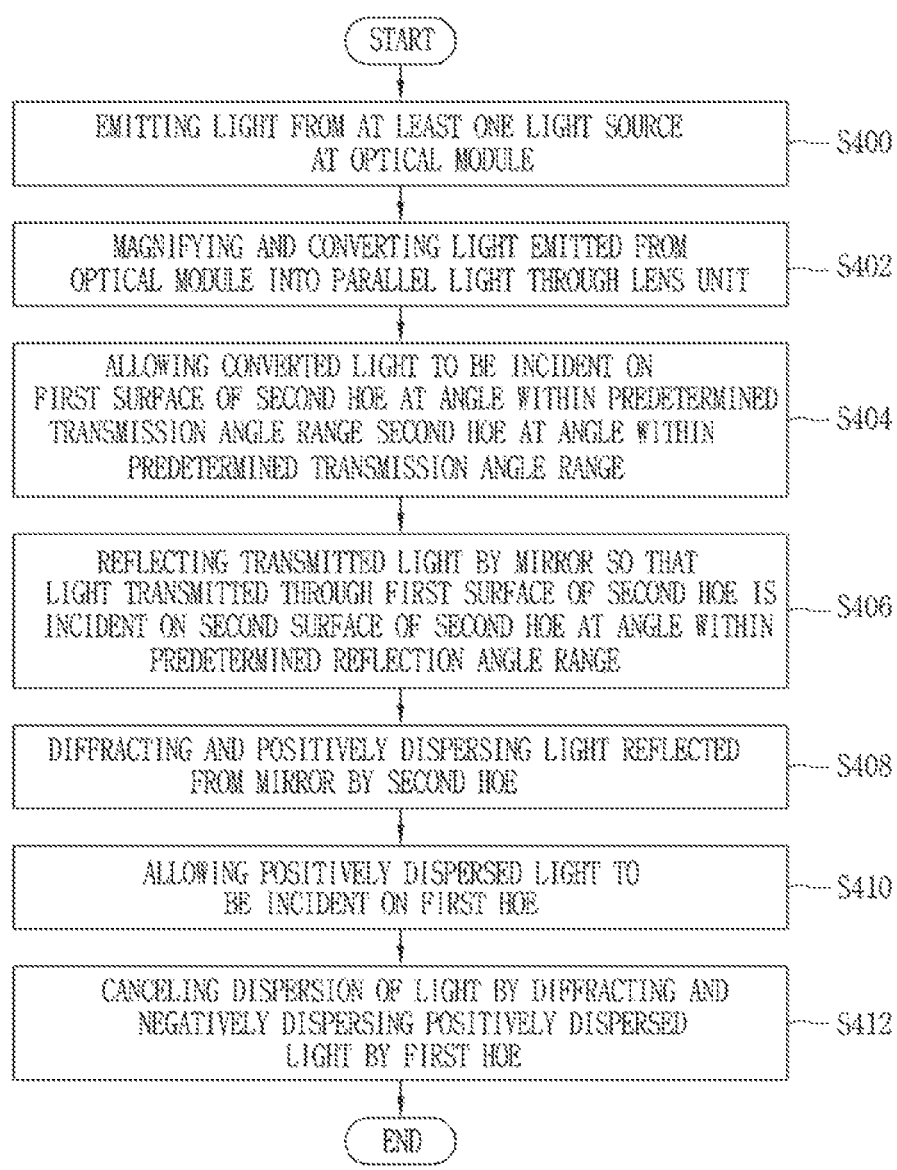
FIG. 4 is a flowchart showing a process of providing a virtual image in a glasses-type device according to an embodiment of the present disclosure.

FIG. 4 is a flowchart showing a process of providing a virtual image in the glasses-type device 100 according to the present disclosure. And, FIGS. 5 and 6 are graphs showing transmission and reflection characteristics of the holographic optical element used in the glasses-type device 100 according to the present disclosure.

First, referring to FIG. 4, the optical module 511 of the glasses-type device 100 according to the embodiment of the present disclosure can emit light to generate an image of a virtual image. To this end, at least one light source, namely, an image source provided in the optical module 511 can emit light [S400].

Meanwhile, the lens unit 512 can disperse and magnify the light emitted from the optical module 511. Then, the magnified light can be converted into parallel light [S402]. In addition, the parallel light converted by the lens unit 512 can be incident on the first surface of the second holographic optical element 302 at an angle within a predetermined light transmission incident angle range, namely, a transmission angle range [S404].

Figure 5:
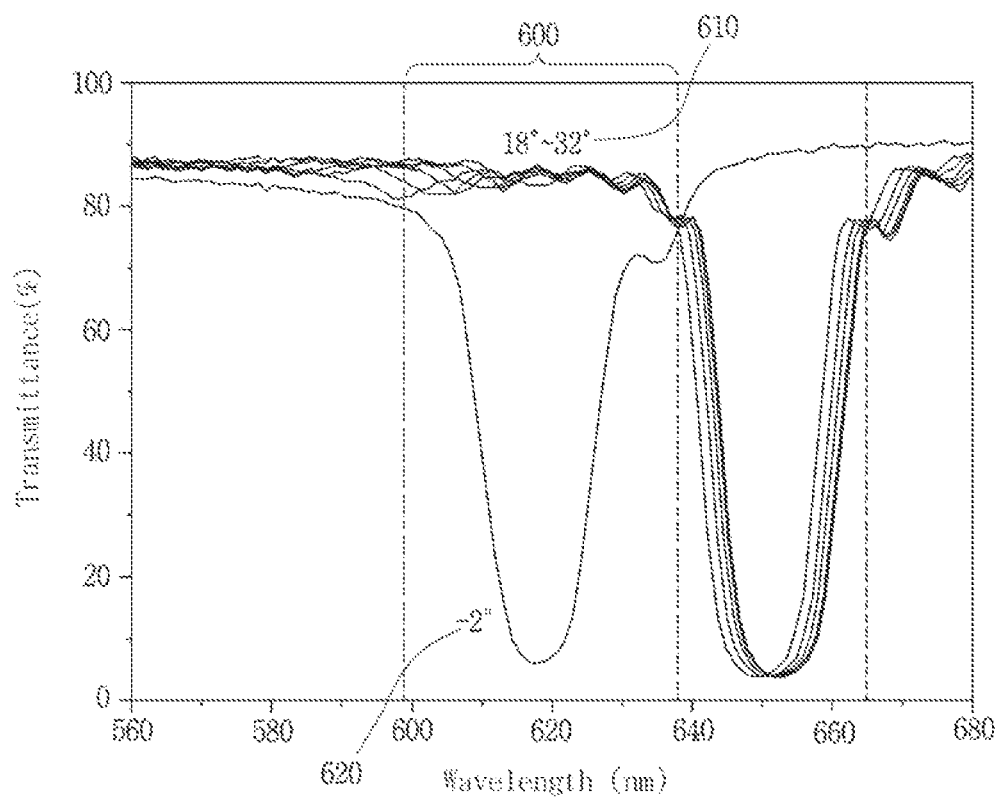
FIGS. 5 and 6 are graphs showing transmission and reflection characteristics of a holographic optical element used in a glasses-type device according to an embodiment of the present disclosure.
Figure 6:
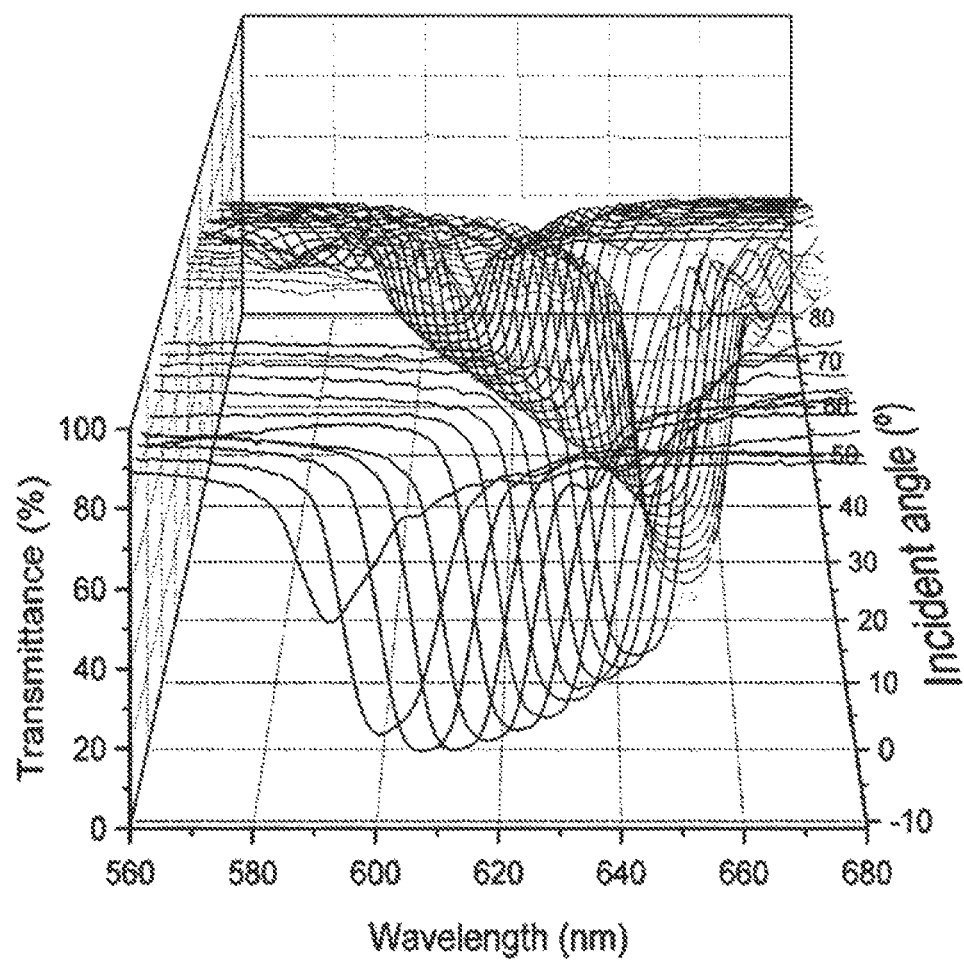

For example, the transmission and reflection characteristics of light according to the light incident angle of the second holographic optical element 302 are as shown in FIGS. 5 and 6. FIGS. 5 and 6 show the transmittance of each wavelength for an incident angle range of −10 degrees (or 350 degrees) to 80 degrees. FIG. 5 shows the transmittance by wavelength corresponding to each incident angle in a two-dimensional graph, and FIG. 6 shows the transmittance by wavelength of each light corresponding to each incident angle range in a three-dimensional graph.

Referring to FIG. 5, each graph of FIG. 5 corresponds to a different angle of incidence, a horizontal axis denotes wavelength (nm), and a vertical axis denotes transmittance. Therefore, as described above, in the present disclosure using a micro LED, a micro OLED, an LCoS, or a digital micromirror device (DMD) with LED or SLD having a wavelength wider than that of laser light as an image source, a holographic optical element has a lowest transmittance for light with an incident angle of −2 degrees (or 358 degrees) and has a high transmittance for light with an incident angle of 18 to 32 degrees, in a wavelength band of light used as an image source, namely, a display wavelength band 600.

Accordingly, in the holographic optical element used in the glasses-type device 100 according to the embodiment of the present disclosure, a predetermined light incident angle at which light is transmitted (or incident angle of transmitted light) can be 18 to 32 degrees, and when the incident angle is out of this range, the holographic optical element reflects light.

With this reason, in order to transmit light through the second holographic optical element 302 to the first reflection element 303, the lens unit 512 is disposed to face the first surface of the second holographic optical element 302 at an angle within an incident angle range (18 to 32 degrees) in which the light is transmitted.

Accordingly, parallel light from the lens unit 512 incident on the second holographic optical element 302 can be transmitted through the second holographic optical element 302. Then, the light transmitted through the second holographic optical element 302 can be incident on the first reflection element 303 disposed to face the second surface of the second holographic optical element 302, and the first reflection element 303 can reflect the transmitted incident light to the second surface of the second holographic optical element 302 [S406].

Here, a path of light transmitting through the first surface of the second holographic optical element 302 (the first path) and a path of light reflected from the first reflection element 303 to be incident on the second surface of the second hologram (the second path) can overlap each other. Accordingly, the first path and the second path can be integrated into one path, thereby saving a space for securing the light path in the diffraction unit 52.

Meanwhile, as shown in FIG. 5, in the holographic optical elements used in the glasses-type device 100 according to the embodiment of the present disclosure, transmittance decreases as light is incident at −2 degrees (or 358 degrees), that is, light is incident in a direction close to horizontal, and reflectance increases accordingly. Therefore, when the light reflected from the first reflection element 303 is incident at an angle out of the predetermined incident angle range (18 to 32 degrees), the incident light can be reflected.

Here, in order to further increase the reflectance of the second holographic optical element 302, the first reflection element 303, namely, a mirror can be arranged such that a direction the reflective surface of the first reflection element 303 is facing and a direction the second surface of the second holographic optical element 302 is facing form −2 degrees angle, so that reflected light is incident on the second surface of the second holographic optical element 302 at a reflection angle within a predetermined range (e.g., −2 degrees). Accordingly, the light reflected from the first reflection element 303 can be incident on the second surface of the second holographic optical element 302 at an angle corresponding to a predetermined reflection angle.

Meanwhile, light incident on the second surface of the second holographic optical element 302 can be diffracted to be positively dispersed. Then, the positively dispersed reflected light can be reflected by the second surface of the second holographic optical element 302 [S408].

Accordingly, the positively dispersed light reflected from the second surface of the second holographic optical element 302 can be incident on the first holographic optical element 301 [S410]. Here, the first holographic optical element 301 can be an optical element capable of negatively dispersing incident light. Therefore, the light incident on the first holographic optical element 301 can be negatively dispersed from the first holographic optical element 301, and the negatively dispersed light can be reflected from the first holographic optical element 301 to be entered into the pupil of the user [S412]. Accordingly, the light dispersion occurred at the second holographic optical element 302 can be canceled by the first holographic optical element 301.

As such, since the glasses-type device 100 according to the embodiment of the present disclosure forms a light path including the second holographic optical element 302, the first reflection element 303, and the first holographic optical element 301 that cancels the light dispersion occurred at the second holographic optical element 302, a clear virtual image can be formed on the glass 112 without using light of an extremely short wavelength such as laser light.

Meanwhile, according to the above description, it has been mentioned that there is a big difference in interpupillary distance (IPD) by individuals or race, sex or age.

Figure 7A:
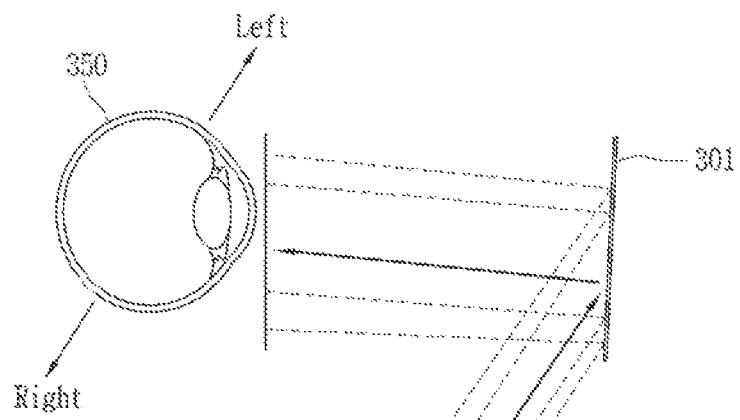
FIGS. 7A and 7B are views illustrating examples of virtual images formed at different positions according to IPD differences according to embodiments of the present disclosure.
Figure 7A:
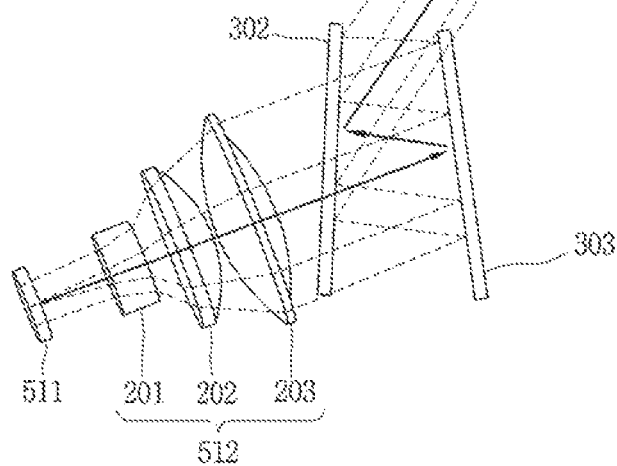
Figure 7A:
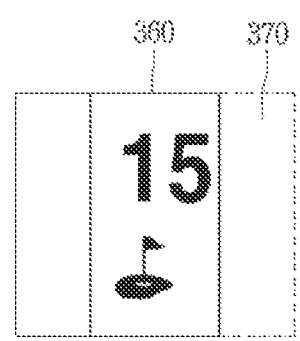
Figure 7B:
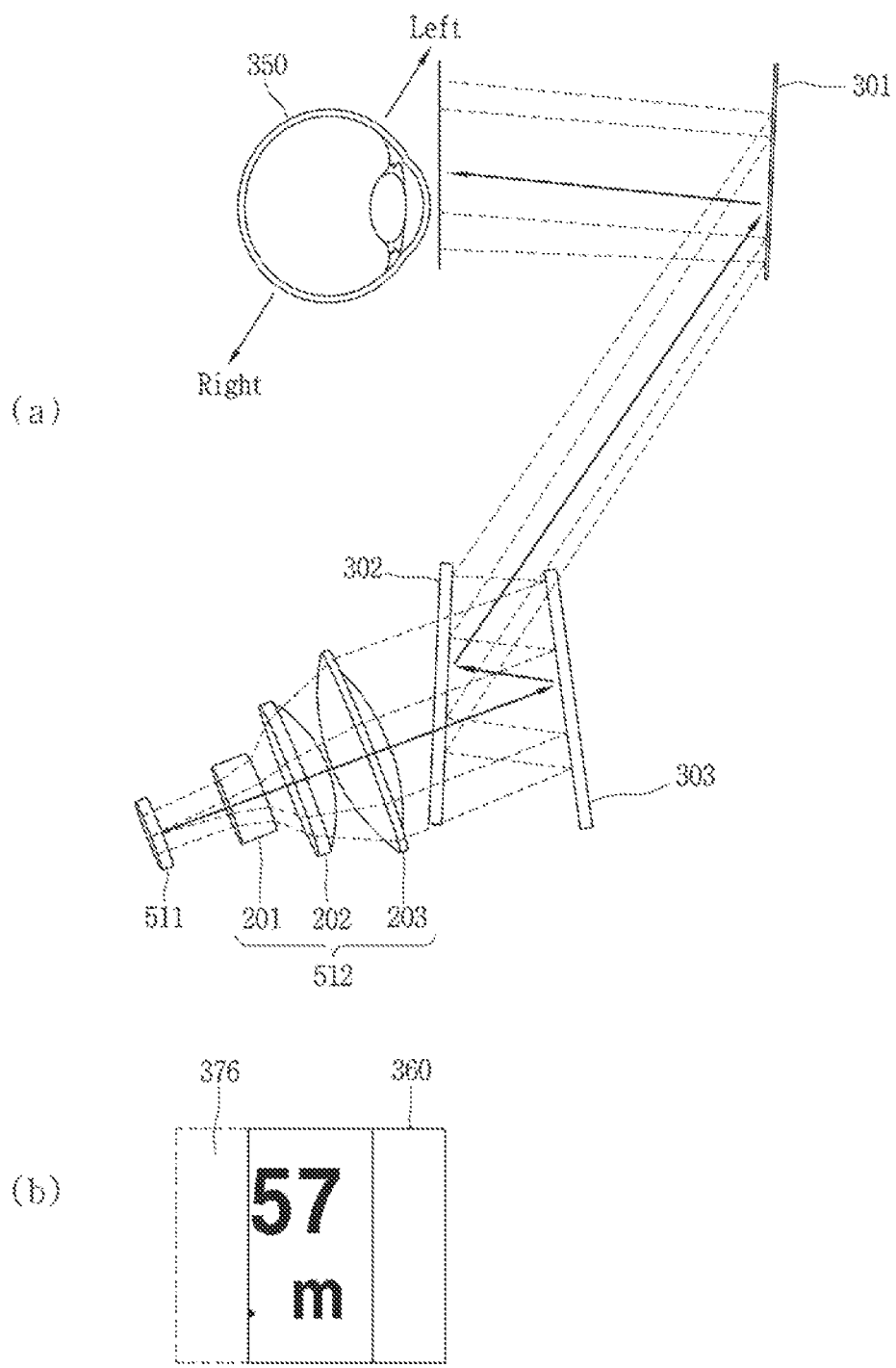

FIGS. 7A and 7B are example views illustrating examples of virtual images formed at different positions according to IPD differences.

Meanwhile, in the following description, it is assumed that a virtual image is generated on a glass corresponding to a user's right eye. However, the present disclosure is not limited thereto. In other words, in a situation where a virtual image is generated on a glass corresponding to a user's left eye also, the virtual image can be generated in one area of the glass corresponding to the left eye in a manner similar to the description below.

First, referring to FIG. 7A, when an IPD of a user is out of a predetermined range due to a size of the user's head or user's physical characteristics, in other words, when the IPD is narrower than a minimum value in the predetermined IPD range, one area of the glass 112 corresponding to the user's pupil can be changed. In this situation, as illustrated in (a) of FIG. 7A, a virtual image can be formed in one area of the glass 112 corresponding to a right side of the user's pupil.

And, when the virtual image is formed in the one area of the glass 112 corresponding to the right side of the user's pupil as described above, the virtual image can be displayed on a position deviated from a center of the EMB 360 to the right as illustrated in (b) of FIG. 7A.

Here, an area in which the virtual image 370 is displayed and the EMB 360 formed by the first holographic optical element 301 can be different. In other words, as the virtual image 370 is displayed on a right side of the EMB 360, a part of the virtual image 370 can be displayed on an area deviated from the EMB 360. Accordingly, as illustrated in (b) of FIG. 7A, a part of the virtual image 370 can be displayed on an area that the user cannot see to thereby cause a problem in which the user cannot see a part of the virtual image 370.

On the contrary, when the IPD of the user is out of the predetermined range due to the size of the user's head or user's physical characteristics, in other words, when the IPD is wider than a maximum value in the predetermined IPD range, the one area of the glass 112 corresponding to the user's pupil can be changed. In this situation, as illustrated in (a) of FIG. 7B, a virtual image can be formed in one area of the glass 112 corresponding to a left side of the user's pupil.

And, when the virtual image is formed in the one area of the glass 112 corresponding to the left side of the user's pupil as described above, the virtual image can be displayed on a position deviated from the center of the EMB 360 to the left as illustrated in (b) of FIG. 7B.

Here, an area in which the virtual image 370 is displayed and the EMB 360 formed by the first holographic optical element 301 may be different. In other words, as the virtual image 370 is displayed on a left side of the EMB 360, a part of the virtual image 370 can be displayed on an area deviated from the EMB 360. Accordingly, as illustrated in (b) of FIG. 7B, this may cause a problem in which the user cannot see a part of the virtual image 370.

In order to solve such problem, the present disclosure allows an angle of light incident on the first holographic optical element 301 to be changed. To this end, in the present disclosure, an angle in which the first reflection element 303 faces the second surface of the second holographic optical element 302 can be changed, so that a reflection angle of light reflected from the second surface of the second holographic optical element 302, that is, light incident on the first holographic optical element 301 is changed. In other words, in the present disclosure, the reflection angle of light reflected from the second surface of the second holographic optical element 302 can be changed by rotating the first reflection element 303 by a predetermined angle to change the incident angle of light incident on the second surface of the second holographic optical element 302.

Figure 8:
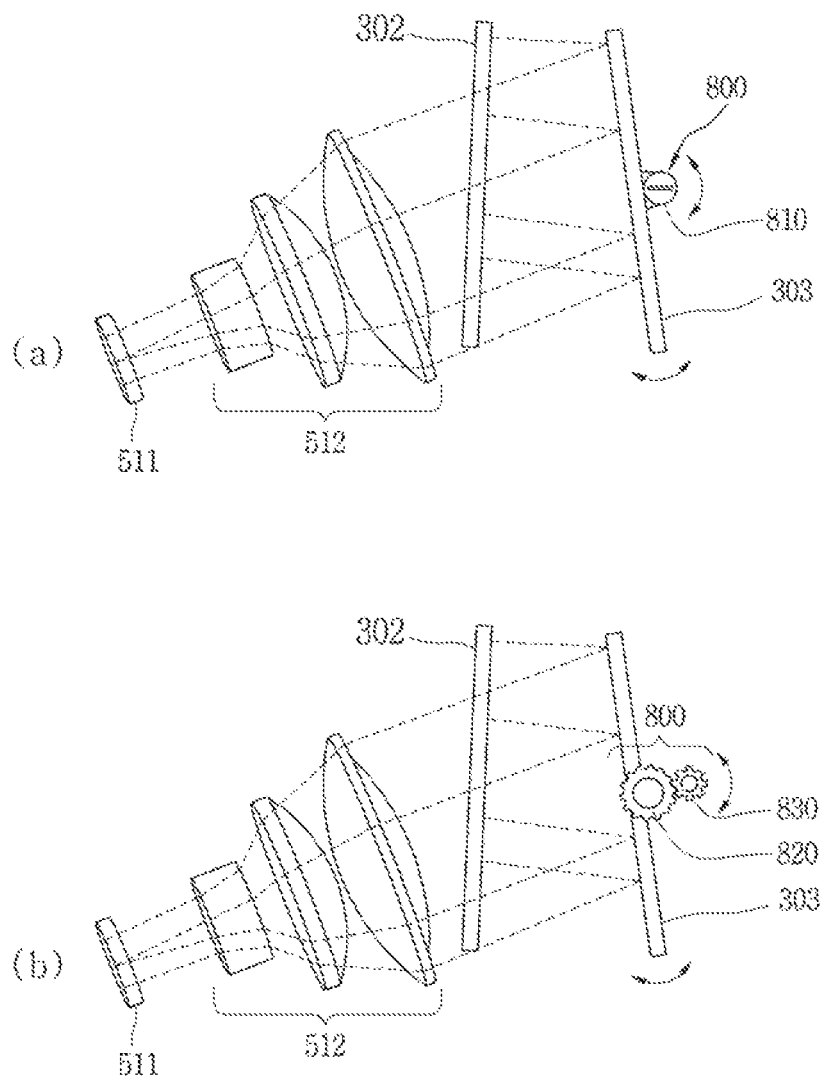
FIG. 8 is a view illustrating examples of a reflection element configured to be tiltable, in a glasses-type device according to an embodiment of the present disclosure.
Figure 9:
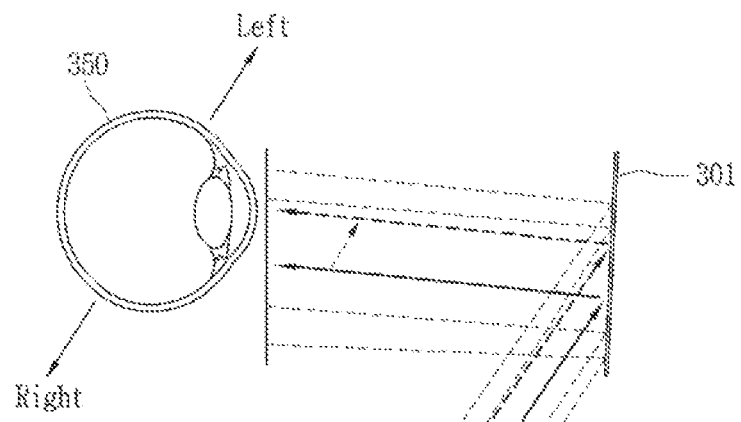
FIGS. 9 and 10 are views illustrating an example in which a difference in virtual image display position due to an IPD difference is compensated by a tilted reflection element, in a glasses-type device according to an embodiment of the present disclosure.
Figure 9:
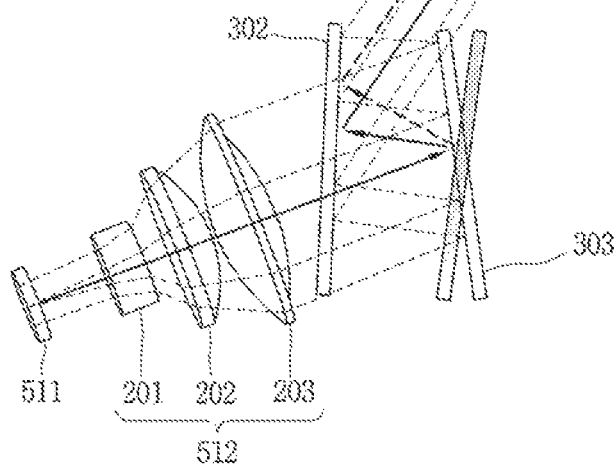
Figure 9:
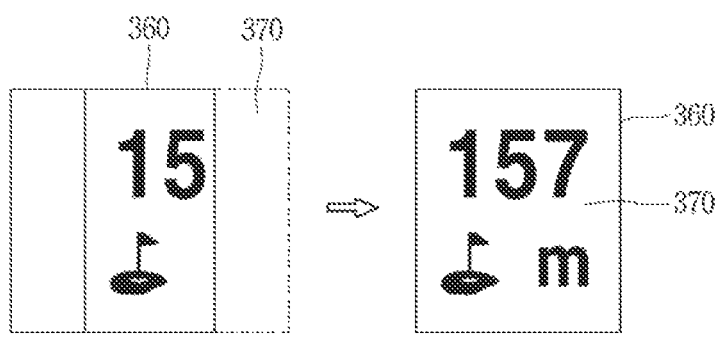
Figure 10:
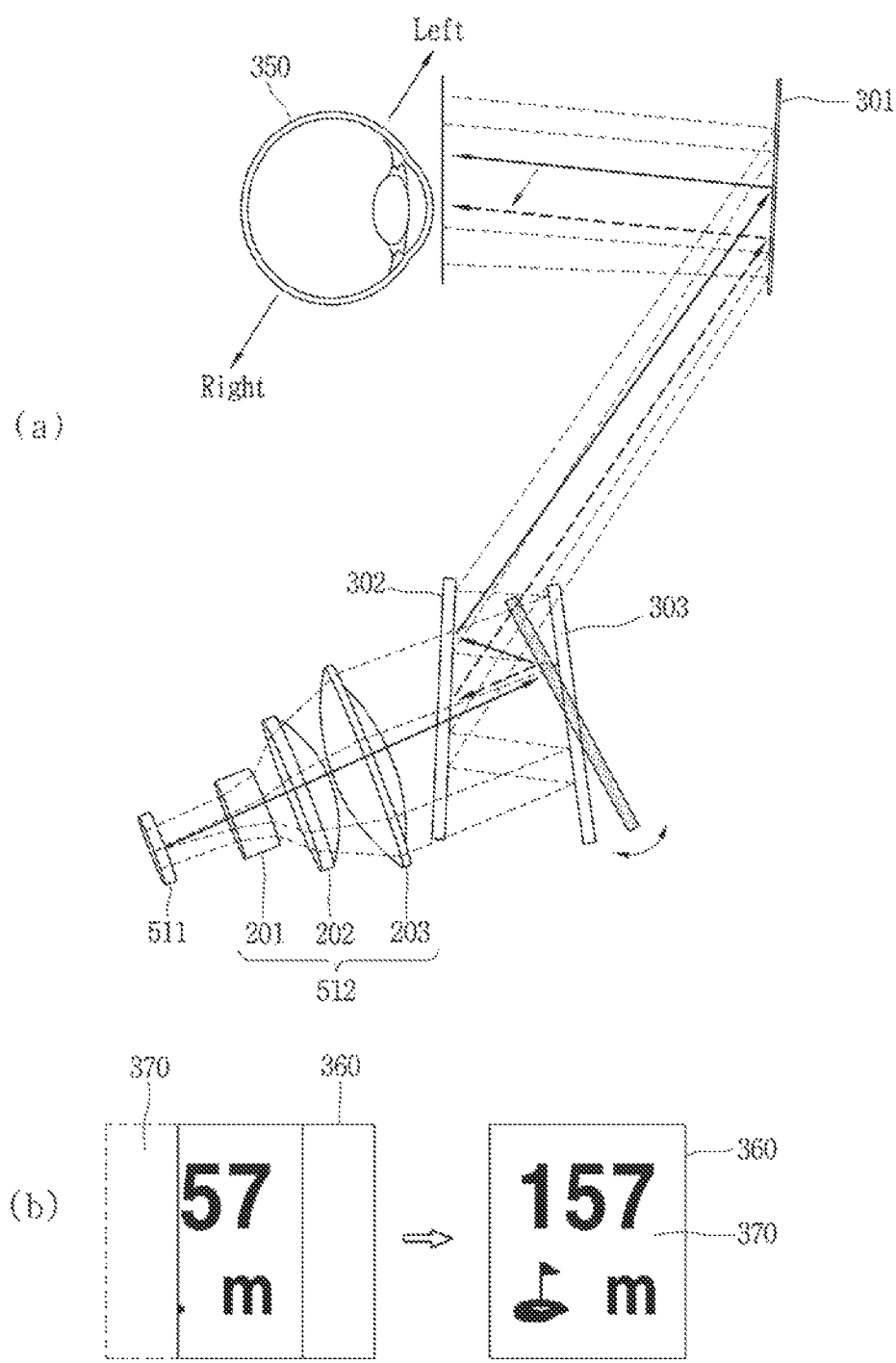

FIG. 8 is an example view illustrating examples of the first reflection element 303 configured to be tiltable, in the glasses-type device 100 related to the present disclosure. And, FIGS. 9 and 10 are example views illustrating an example in which a difference in virtual image display position due to an IPD difference is compensated by the tilted first reflection element 303, in the glasses-type device 100 according to the present disclosure.

First, referring to (a) and (b) of FIG. 8, the diffraction unit 52 according to the embodiment of the present disclosure can further include a tilting portion 800 for tilting the first reflection element 303. To this end, a rear surface of the first reflection element 303 can be provided with a rotation shaft 820 crossing a center of the first reflection element 303 in a vertical direction, and the tilting portion 800 can include at least one component for rotating the rotation shaft 820 in a clockwise or counterclockwise direction.

For example, the rotation shaft 820 can have a plurality of protrusions formed at equal intervals on an outer circumferential surface of the rotation shaft to have a cogwheel shape. In addition, the tilting portion 800 can include a gear 830 having protrusions engaged like cogs with the plurality of protrusions formed on the rotation shaft 820, and a dial gauge 810 including the gear 830 or connected to the gear 830.

Meanwhile, the dial gauge 810 can be configured to be rotatable as illustrated in (a) and (b) of FIG. 8. In addition, a rotational motion of the dial gauge 810 can be transferred to the rotation shaft 820 of the first reflection element 303 through the gear 830 connected to the dial gauge 810 or integrated with the dial gauge 810. Therefore, as the dial gauge 810 is rotated, the first reflection element 303 can be rotated by a predetermined angle, and as the first reflection element 303 is rotated, an angle at which a front surface of the first reflection element 303 faces can be changed.

Here, when the angle at which the front surface of the first reflection element 303 is changed, an incident angle at which light reflected by the first reflection element 303 is incident on the second surface of the second holographic optical element 302 can be changed. Then, a reflection angle of light reflected from the second surface of the second holographic optical element 302 can also be changed, and accordingly, a position of an incidence point of light incident on the first holographic optical element 301 can be changed.

For example, as illustrated in (a) of FIG. 9, when the first reflection element 303 is rotated in a direction to increase an incident angle of light incident on the second surface of the second holographic optical element 302, a reflection angle of light reflected from the second surface of the holographic optical element 302 can also be increased.

Accordingly, as illustrated in (a) of FIG. 9, an incident angle at which light reflected from the second holographic optical element 302 is incident on the first holographic optical element 301 can be increased. Therefore, since a position where the light incident from the second holographic optical element 302 is reflected is moved left on the first holographic optical element 301, a position of a virtual image reflected on a user's eye can be moved left, in other words, can be moved in a direction towards a glabella of the user (or inward direction of both eyes).

Accordingly, as the user's IPD is narrower than a predetermined level, a position where the virtual image 370 is formed can be moved left in a state in which an area where the virtual image 370 is displayed is deviated from the EMB 360 and a right part of the virtual image 370 is displayed as if it is cut off, as illustrated in a first drawing (or left drawing) of (b) of FIG. 9. Therefore, as illustrated in a second drawing (or right drawing) of (b) of FIG. 9, the entire virtual image can be displayed in the EMB 360, and accordingly, the user can visually view the entire virtual image.

On the other hand, as illustrated in (a) of FIG. 10, when the first reflection element 303 is rotated in a direction to decrease the incident angle of light incident on the second surface of the second holographic optical element 302, the reflection angle of light reflected from the second surface of the holographic optical element 302 can also be decreased.

Accordingly, as illustrated in (a) of FIG. 10, the incident angle at which light reflected from the second holographic optical element 302 is incident on the first holographic optical element 301 can be decreased. Therefore, since a position where the light incident from the second holographic optical element 302 is reflected is moved right on the first holographic optical element 301, a position of a virtual image reflected on the user's eye can be moved right, in other words, can be moved in a direction towards a temple of the user (or outward direction of both eyes).

Accordingly, as the user's IPD is wider than a predetermined level, a position where the virtual image 370 is formed can be moved right in a state in which an area where the virtual image 370 is displayed is deviated from the EMB 360 and a left part of the virtual image 370 is displayed as if it is cut off, as illustrated in a first drawing (or left drawing) of (b) of FIG. 10. Therefore, as illustrated in a second drawing (or right drawing) of (b) of FIG. 10, the entire virtual image can be displayed in the EMB 360, and accordingly, the user can visually view the entire virtual image.

Figure 11:
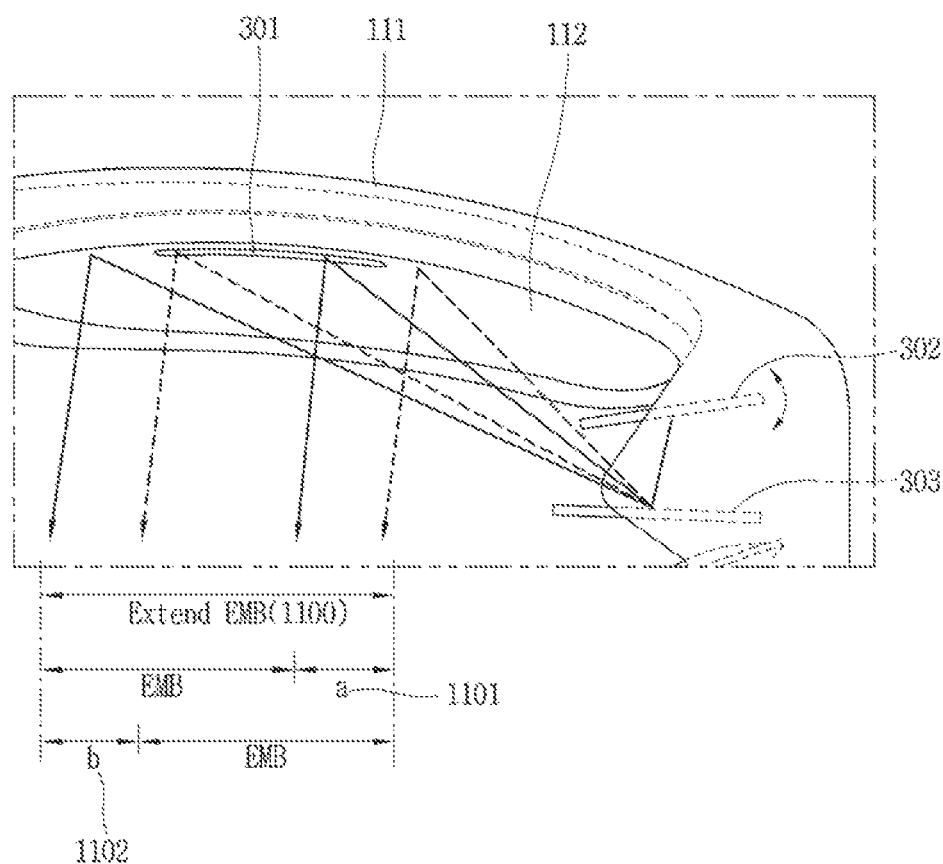
FIG. 11 is a conceptual view illustrating a concept in which an eye movement box (EMB) is extended by a tilted reflection element in a glasses-type device according to an embodiment of the present disclosure.

In this manner, in the present disclosure, a position at which a virtual image is displayed can be moved left or right by tilting the first reflection element 303. Accordingly, the EMB of the present disclosure can be extended within an extent in which a virtual image display position can be changed. FIG. 11 is a conceptual view illustrating a concept in which the EMB is extended by the tilted first reflection element 303 in the glasses-type device 100 related to the present disclosure.

As described above, in the glasses-type device 100 according to the embodiment of the present disclosure, when a part of the virtual image deviates from the EMB due to the difference in IPD, a position at which the virtual image is displayed can be changed by rotating the first reflection element 303.

Therefore, even if a right part of the virtual image is viewed as if it is cut off by a length corresponding to a 1101 due to the user's IPD difference, the user can view the entire virtual image by rotating the first reflection element 303 to move the virtual image display position. In addition, even if a left part of the virtual image is viewed as if it is cut off by a length corresponding to b 1102 due to the user's IPD difference, the user can view the entire virtual image by rotating the first reflection element 303 to move the virtual image display position.

Therefore, according to the present disclosure, the EMB in which the user can identify the virtual image can be extended within an extent in an area corresponding to the length a 1101 or the length b 1102 from the existing EMB area, and accordingly, an extended EMB area 1100 can be formed as illustrated in FIG. 11.

Figure 12:
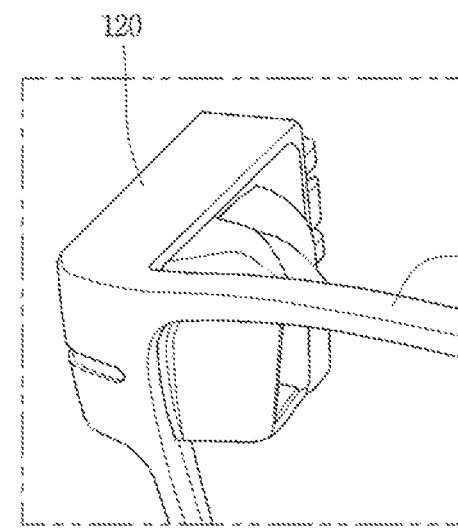
FIG. 12 is a view illustrating an example of a housing of a body portion of a glasses-type device according to an embodiment of the present disclosure including a reflection element configured to be tiltable.
Figure 12:
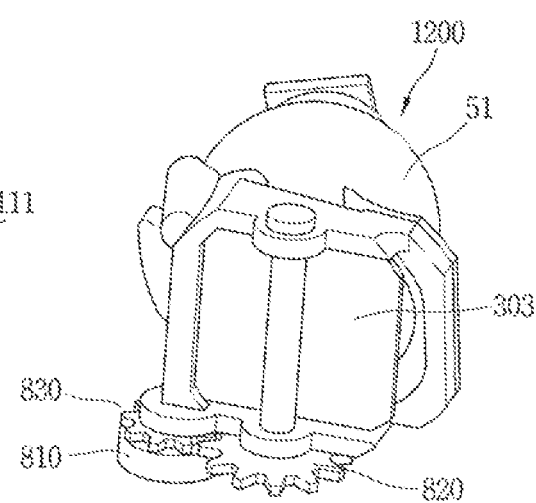
Figure 12:
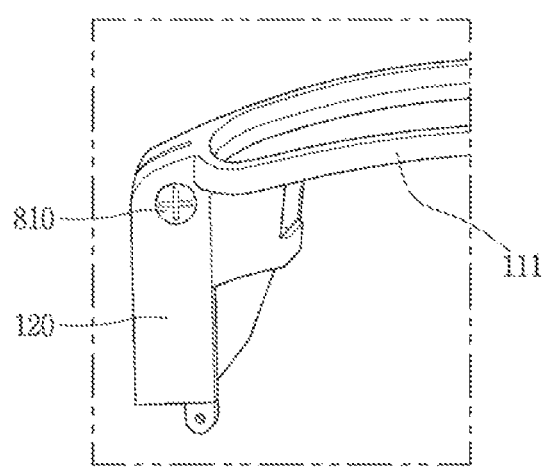
Figure 12:
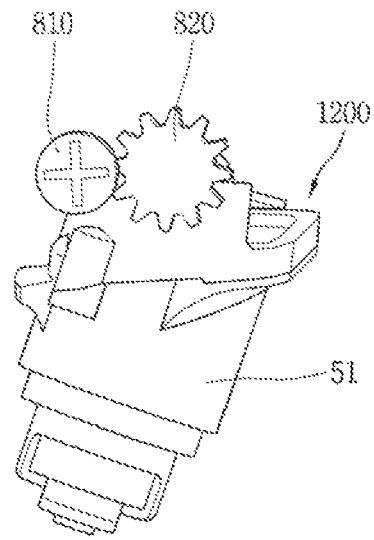

FIG. 12 is an example view illustrating an example of a housing 1200 of the glasses-type device 100 according to the present disclosure including the first reflection element configured to be tiltable.

First, (a) and (c) of FIG. 12 each show an example in which the housing 1200 is coupled to the body portion 120 of the glasses-type device 100 viewed from different sides. First, the second frame portion 130 can provide a space in which the housing 1200 is mounted, and the housing 1200 can be coupled to the body portion 120 in a form in which the housing 1200 is accommodated in the space provided in the second frame portion 130.

The housing 1200 can be formed to surround the display unit 51 including the optical module 511 and the lens unit 512 as illustrated in (c) and (d) of FIG. 12. In addition, the housing 1200 can be coupled with the second holographic optical element 302 and the first reflection element 303. Here, the first reflection element 303 can include the rotation shaft 820 having protrusions of a cogwheel shape formed to be engaged like cogs with at least a part of cogs of the gear 830. In addition, the gear 830 can be formed integrally with the dial gauge 810 to transfer a rotational force according to the rotation of the dial gauge 810 to the rotation shaft 820.

Meanwhile, the dial gauge 810 can be formed to be exposed outside the second frame portion 130 as illustrated in (c) of FIG. 12. Therefore, the user can rotate the dial gauge 810, and according to the rotation of the dial gauge 810, the first reflection element 303 can be rotated in a direction increasing or decreasing the incident angle of the light incident on the second surface of the second holographic optical element 302.

Meanwhile, in the above description, a configuration in which the first reflection element 303 is tilted according to the rotation of the dial gauge 810 is disclosed, but unlike this, the first reflection element 303 can also be configured to be automatically tilted.

For example, the tilting portion 800 can further include an actuator that provides a rotational force to the gear 830 instead of the dial gauge. In this situation, the actuator can be configured to rotate the gear 830 by the control of the controller 10, so that the first reflection element 303 is rotated by the rotational force transferred from the gear 830.

Meanwhile, an angle in which the first reflection element 303 is rotated by the actuator can be determined by the controller 10 according to a result of sensing the user's IPD. For example, the controller 10 can calculate a distance between centers of pupils of eyes based on positions of the pupils of both eyes of the user obtained by the camera 31.

Alternatively, the controller 10 can measure an angle between a left body portion and a left glass supporting a left leg portion of the glasses-type device 100 and an angle between a right body portion and a right glass supporting a right leg portion of the glasses-type device 100, then calculate a size of the user's head according to the measured angle and estimate the IPD corresponding to the calculated head size.

Figure 13:
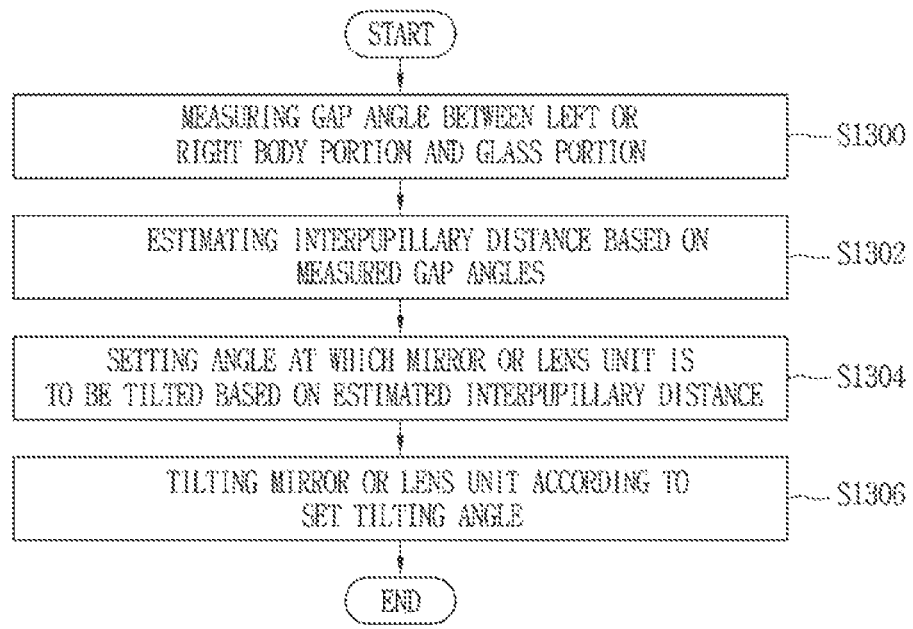
FIG. 13 is a flowchart showing an operation process of performing tilting to compensate for a difference in virtual image display position due to an IPD difference in a glasses-type device according to an embodiment of the present disclosure.

FIG. 13 is a flowchart showing an operation process of performing tilting to compensate for a position where a virtual image is displayed based on an IPD estimated according to an angle between a glass portion and a body portion in the glasses-type device 100 according to the present disclosure.

Referring to FIG. 13, the controller 10 of the glasses-type device 100 according to the embodiment of the present disclosure can first measure an angle between the left body portion supporting the glass portion of the glasses-type device 100 and the left glass corresponding to the left eye and an angle between the right body portion and the right glass corresponding to the right eye [S1300]. For example, the measured angles can be an angle in which the left leg portion and the right leg portion of the glasses-type device 100 are spread. Hereinafter, the angles measured in the step S1300 will be referred to as gap angles.

Meanwhile, when the gap angles are measured in the step S1300, the controller 10 can determine whether the measured gap angles are within a predetermined angle range. In addition, when the measured gap angles are within a predetermined angle range, it can be determined that the first reflection element 303 does not need to be tilted. Here, the controller 10 may not rotate the first reflection element 303.

On the other hand, when at least one of the measured gap angles is less than or greater than a predetermined angle range (or a standard angle range), the controller 10 can estimate the distance between the pupils of the user's eyes, namely, IPD based on the measured gap angles [S1302].

For example, the controller 10 can subtract a distance corresponding to a gap angle measured smaller than the standard angle range from a predetermined standard IPD value, or add a distance corresponding to a gap angle measured greater than the standard angle range.

The distance corresponding to the measured gap angle can be subtracted or added for each of the gap angles calculated by each of the body portions. In other words, when the gap angle (or first gap angle) measured at the left body portion (or left leg portion) is smaller than the predetermined angle range, and the gap angle (or second gap angle) measured at the right body portion (or right leg portion) is greater than the predetermined angle range, the controller 10 can subtract a distance corresponding to the first gap angle from a distance corresponding to the standard IPD and add a distance corresponding to the second gap angle to the standard IPD from which the distance corresponding to the first gap angle is subtracted to estimate the user's IPD.

Meanwhile, when the user's IPD is estimated in the step S1302, the controller 10 can calculate an angle in which the first reflection element 303 is to be tilted based on the estimated IPD [S1304]. For example, when the estimated IPD is wider than the standard IPD, the controller 10 can determine an angle in which the first reflection element 303 is to be tilted in a direction to decrease the incident angle of light incident on the second holographic optical element 302.

On the other hand, when the estimated IPD is narrower than the standard IPD, the controller 10 can determine an angle in which the first reflection element 303 is to be tilted in a direction to increase the incident angle of light incident on the second holographic optical element 302. When a tilting angle is determined, the controller 10 can control the actuator provided in the tilting portion 800 to tilt the first reflection element 303 by the tilting angle determined in the step S1304 [S1306].

Meanwhile, when the virtual image is displayed on either the left eye glass or the right eye glass, the step S1300 can be a step of measuring a gap angle between a leg portion corresponding to any one glass on which the virtual image is displayed and the any one glass. In addition, the step S1302 can be a step of comparing the measured one gap angle with a minimum angle or a maximum angle in the standard angle range, and the step S1304 may be a step of determining a tilting angle of the first reflection element 303 according to a difference between the measured one gap angle and the minimum angle or the maximum angle in the standard angle range.

When the measured gap angle is smaller than the minimum angle in the standard angle range, the controller 10 may determine a tilting angle of the first reflection element 303 according to the difference between the measured gap angle and the minimum angle in the standard angle range in the step S1304. In the step S1306, the first reflection element 303 may be tilted in a direction in which the incident angle of light incident on the second holographic optical element 302 is reduced by the determined tilting angle.

On the other hand, when the measured gap angle is greater than the maximum angle in the standard angle range, the controller 10 may determine a tilting angle of the first reflection element 303 according to the difference between the measured gap angle and the maximum angle in the standard angle range in the step S1304. And, in the step S1306, the first reflection element 303 may be tilted in a direction in which the incident angle of light incident on the second holographic optical element 302 is increased by the determined tilting angle.

Meanwhile, in the above description, it has been described that the incident angle of light incident on the second holographic optical element 302 is increased or decreased by tilting the first reflection element 303, but unlike this, the incidence angle of light incident on the second holographic optical element 302 may also be increased or decreased by changing an angle of light itself. In this case, the display unit 51 of the glasses-type device 100 according to the embodiment of the present disclosure may be configured to be rotatable by a predetermined angle in a clockwise or counterclockwise direction, and the display unit 51 may be provided with a dial gauge or an actuator capable of rotating the display unit 51.

Figure 14:
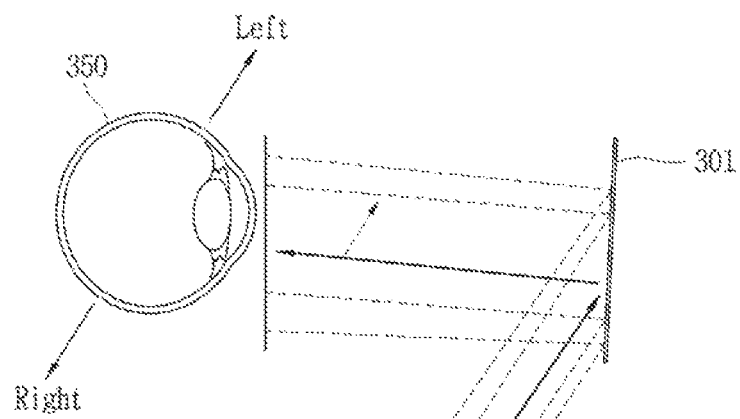
FIGS. 14 and 15 are views for explaining examples in which a difference in virtual image display position due to an IPD difference is compensated according to tilting of a display unit according to an embodiment of the present disclosure.
Figure 14:
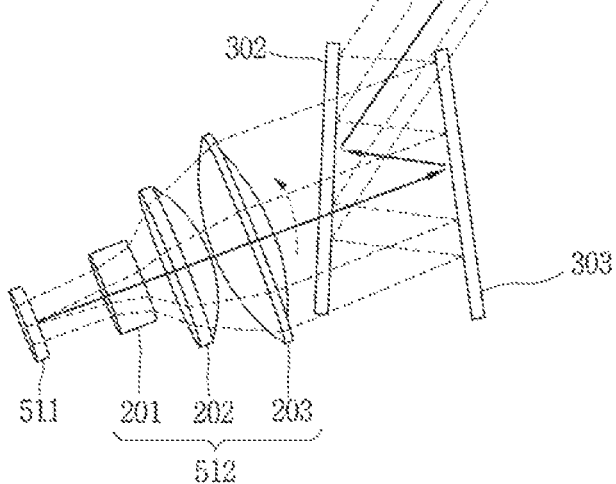
Figure 14:
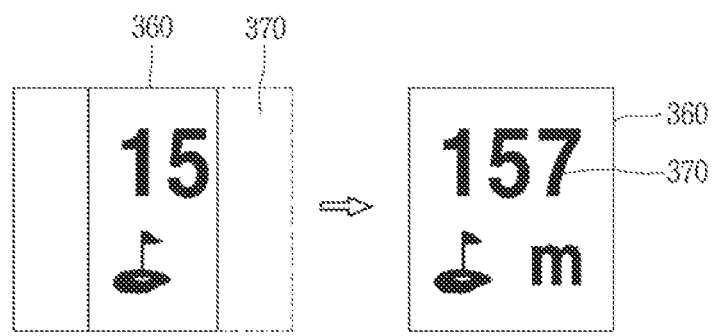
Figure 15:
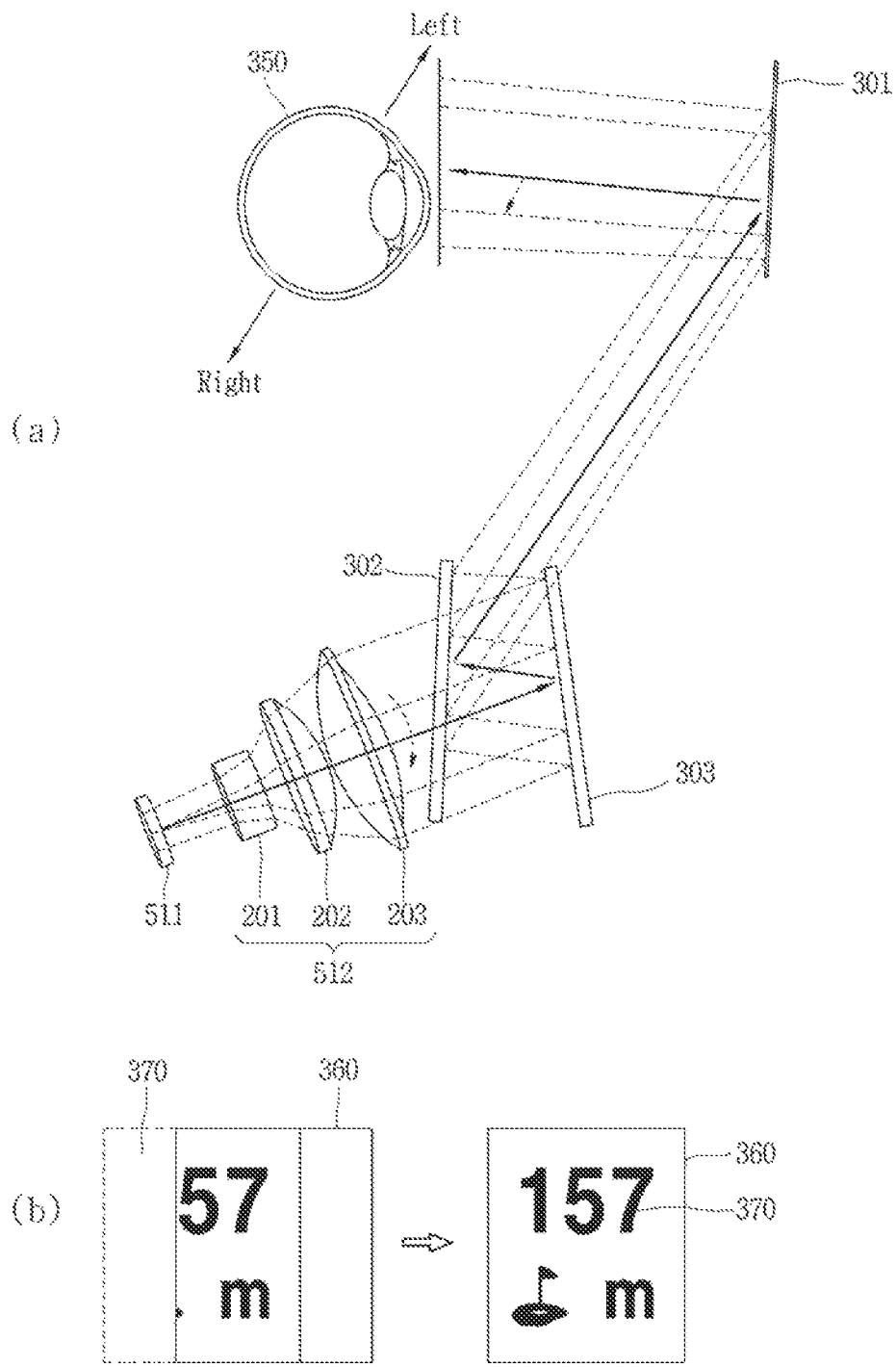

FIGS. 14 and 15 are example views for explaining examples in which a difference in virtual image display position due to an IPD difference is compensated according to the tilting of the display unit 51 configured to be rotatable as described above.

As described above, when the display unit 51 is configured to be rotatable by a predetermined angle, a direction in which the display unit 51 is facing may be changed according to the rotation. Accordingly, an incident angle at which parallel light converted by the lens unit 512 is incident on the first surface of the second holographic optical element 302 may be changed. And accordingly, an incident angle of light incident on the reflection element 303 through the second holographic optical element 302 may be changed.

Here, as illustrated in (a) of FIG. 14, when the display unit 51 is rotated (or tilted) in a direction increasing the incident angle of light incident on the first reflection element 303, an angle at which the reflected light of the first reflection element 303 is incident on the second surface of the second holographic optical element 302 may be increased. Then, a reflection angle of light reflected from the second surface of the second holographic optical element 302 may also be increased, and accordingly, a position at which the reflected light is reflected from the first holographic optical element 301, that is, a position at which a virtual image is displayed may be moved left.

As described above, when the incident angle of light incident on the first holographic optical element 301 is increased, a position at which the reflected light from the first holographic optical element 301 is incident on the user's pupil may be moved left. Accordingly, as illustrated in (a) of FIG. 14, a position at which a virtual image to be reflected on the user's eye is displayed may be moved left.

Accordingly, as the user's IPD is narrower than a predetermined level, a position where the virtual image 370 is displayed may be moved left in a state in which the virtual image 370 is deviated from the EMB 360 and a right part of the virtual image 370 is displayed as if it is cut off, as illustrated in a first drawing (or left drawing) of (b) of FIG. 14. Therefore, as illustrated in a second drawing (or right drawing) of (b) of FIG. 14, the entire virtual image can be displayed in the EMB 360, and accordingly, the user can visually view the entire virtual image.

On the other hand, as illustrated in (a) of FIG. 15, when the display unit 51 is rotated (or tilted) in a direction decreasing the incident angle of light incident on the first reflection element 303, an angle at which the reflected light of the first reflection element 303 is incident on the second surface of the second holographic optical element 302 may be decreased. Then, a reflection angle of light reflected from the second surface of the second holographic optical element 302 may also be decreased, and accordingly, a position at which the reflected light is reflected from the first holographic optical element 301, that is, a position at which a virtual image is displayed may be moved right.

As such, when the incident angle of light incident on the first holographic optical element 301 is decreased, a position at which the reflected light from the first holographic optical element 301 is incident on the user's pupil may be moved right. Accordingly, as illustrated in (a) of FIG. 15, a position at which a virtual image to be reflected on the user's eye is displayed may be moved right.

Accordingly, as the user's IPD is wider than a predetermined level, a position where the virtual image 370 is displayed may be moved right in a state in which the virtual image 370 is deviated from the EMB 360 and a left part of the virtual image 370 is displayed as if it is cut off, as illustrated in a first drawing (or left drawing) of (b) of FIG. 15. Therefore, as illustrated in a second drawing (or right drawing) of (b) of FIG. 15, the entire virtual image can be displayed in the EMB 360, and accordingly, the user can visually view the entire virtual image.

Meanwhile, in the above description, an example in which a light path is formed such that light emitted from the display unit 51 through the second holographic optical element 302 and the first reflection element 303 reaches the first holographic optical element 301 forming the EMB is described. However, it goes without saying that a light path in which light emitted from the display unit 51 reaches the first holographic optical element 301 by using one diffraction element that refracts incident light at a predetermined angle may also be formed.

Figure 16:
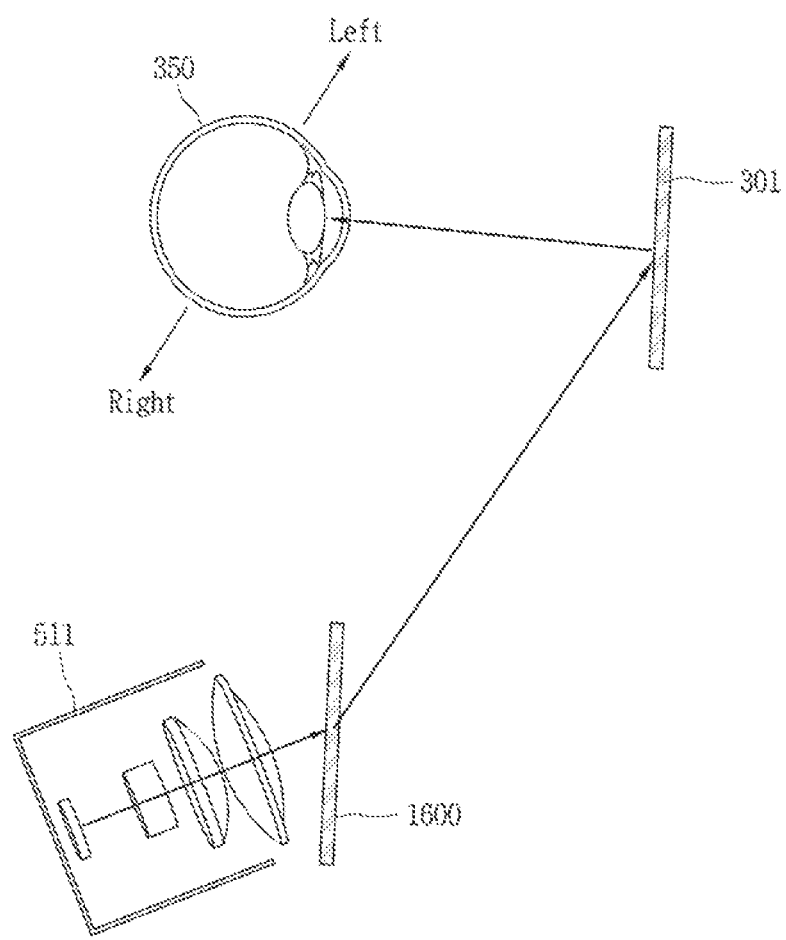
FIG. 16 is a view illustrating an example in which a diffraction unit of a glasses-type device is formed as one diffraction element according to an embodiment of the present disclosure.

FIG. 16 is an example view illustrating an example of an optical system that transmits light emitted from the display unit 51 to the first hologram optical element 301 by one diffraction element.

Referring to FIG. 16, the display unit 51 of the glasses-type device 100 according to an embodiment of the present disclosure may allow parallel light converted through the lens unit 512 to be incident on the first surface of a predetermined diffraction element 1600. Then, the incident parallel light may be redirected at a predetermined angle by diffraction at the diffraction element 1600, and the parallel light may be incident on the first holographic optical element 301 by the redirection.

Here, the diffraction element 1600 may be a holographic optical element that, when light is incident at an angle within a predetermined range, redirects and transmits the incident light at a predetermined angle. Here, the light diffracted by the diffraction element 1600 may be positively dispersed during a diffraction process, and accordingly, the positively diffracted light may be incident on the first holographic optical element 301.

Meanwhile, the first holographic optical element 301 may be an optical element that negatively disperses the incident light in order to cancel the dispersion of the light (or positive dispersion). Accordingly, light diffracted and dispersed by the diffraction element 1600 may be negatively dispersed and reflected by the first holographic optical element 301 to enter a pupil of a user. Therefore, a virtual image that does not contain optical noise due to dispersion may be formed on one area EMB on the glass 112.

Figure 17:
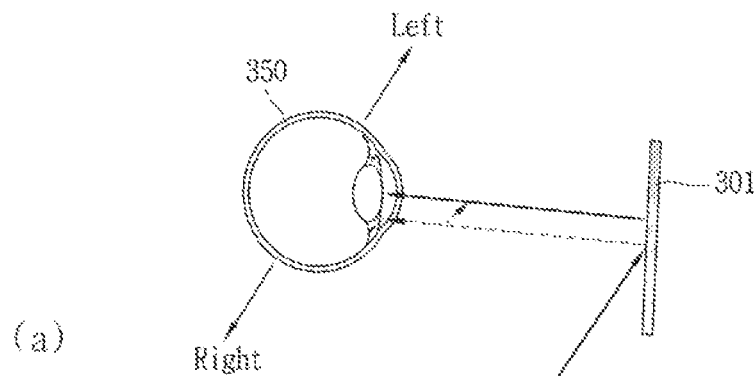
FIG. 17 is a conceptual view illustrating a glasses-type device compensate a difference in virtual image display position due to an IPD difference by tilting a display unit when a diffraction unit is formed as one diffraction element according to an embodiment of the present disclosure.
Figure 17:
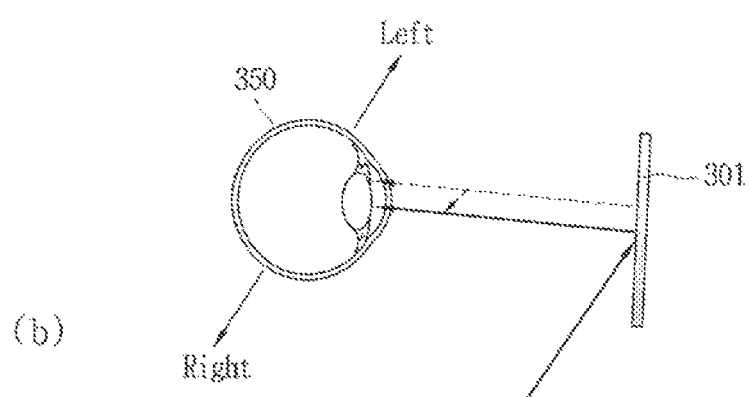

FIG. 17 is a conceptual view illustrating the glasses-type device 100 according to the present disclosure to compensate for a difference in virtual image display position due to an IPD difference by tilting the display unit 51 when light from an image source is transmitted to the first hologram optical element 301 through one diffraction element as described above.

First, referring to (a) of FIG. 17, when the display unit 51 is rotated in a direction in which an incident angle at which light emitted from the display unit 51 is incident on the diffraction element 1600 is increased, an incident angle of light incident on the first holographic optical element 301 by the diffraction element 1600 may also be increased.

Accordingly, a position of the incident point of light incident on the first holographic optical element 301 may be moved left. And, as a position of an incident point of light which is reflected from the first holographic optical element 301 to be incident on the pupil of the user is moved left, a position at which a virtual image to be reflected on the user's eye is displayed may be moved left.

Accordingly, when a right part of the virtual image is not visible as the user's IPD is narrower than a predetermined level, a position where the virtual image is displayed may be moved left by tilting the display unit 51 by a predetermined angle. And, by allowing the virtual image to be displayed within the EMB, a user with an IPD narrower than a predetermined level can also view the entire virtual image without a cut off area.

On the other hand, referring to (b) of FIG. 17, when the display unit 51 is rotated in a direction in which an incident angle at which light emitted from the display unit 51 is incident on the diffraction element 1600 is decreased, an incident angle of light incident on the first holographic optical element 301 by the diffraction element 1600 may also be decreased.

Accordingly, a position of an incident point of light incident on the first holographic optical element 301 may be moved right. And, as a position of an incident point of light which is reflected from the first holographic optical element 301 to be incident on the pupil of the user is moved right, a position at which a virtual image to be reflected on the user's eye is displayed may be moved right.

Accordingly, when a left part of the virtual image is not visible as the user's IPD is wider than a predetermined level, a position where the virtual image is displayed may be moved right by tilting the display unit 51 by a predetermined angle. And, by allowing the virtual image to be displayed within the EMB, a user with an IPD wider than a predetermined level can also view the entire virtual image without a cut off area.

Meanwhile, according to the above description, it has been mentioned that the first reflection element 303 is a full reflection mirror or a half reflection mirror. However, the present disclosure is not limited thereto.

For example, it has been described that a holographic optical element has a characteristic of reflecting light when the light is incident at an angle out of a predetermined incident angle that transmits light. Therefore, it goes without saying that the holographic optical element may be used as the first reflection element 303 when such a reflective characteristic of the holographic optical element is used.

The present disclosure can be implemented as computer-readable codes in program-recorded media. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the controller 20. The computer may also include the controller 10 of the glasses-type device 100.

Therefore, the detailed description should not be limitedly construed in all of the aspects, and should be understood to be illustrative. All changes and modifications that fall within the metes and bounds of the claims, or equivalents of such metes and bounds are therefore intended to be embraced by the appended claims.

What is claimed is:

1. A glasses-type device, comprising:
 a display part configured to emit image light serving as an image source of a virtual image;

a diffraction element configured to reflect and diffract the image light at a predetermined angle; and a first holographic optical element disposed on at least a portion of glass of the glasses-type device, wherein the first holographic optical element is configured to:

cancel dispersion of the image light that is reflected and diffracted by the diffraction element, and reflect the light in which dispersion is canceled to display a virtual image corresponding to the image light, wherein the display part is disposed to face a second holographic optical element at an angle within a first predetermined incident angle range, so that the image light incident on a first surface of the second holographic optical element transmits through the second holographic optical element toward a first reflection element, and wherein a reflective surface of the first reflection element faces toward a second surface of the second holographic optical element, so that light transmitted through the second holographic optical element is reflected off of the reflective surface of the first reflection element and onto the second surface of the second holographic optical element at an angle within a second predetermined reflection angle range.

2. The glasses-type device of claim 1, wherein the diffraction element comprises:

the second holographic optical element configured to transmit light when the light is incident on the second holographic optical element at the angle within the first predetermined incident angle range, and reflect light when the light is incident on the second holographic optical element at the angle within the second predetermined reflection angle range; and the first reflection element arranged with the reflective surface of the first reflection element facing toward the second surface of the second holographic optical element at a predetermined angle.

3. The glasses-type device of claim 1, wherein the reflective surface of the first reflection element and the second surface of the second holographic optical element are disposed to face each other, so that a first light path in which light transmitted through the second holographic optical element is led to the reflective surface of the first reflection element and a light path in which light reflected from the reflective surface of the first reflection element is led to the second surface of the second holographic optical element overlap each other.

4. The glasses-type device of claim 1, wherein the first reflection element is a full reflection mirror reflecting all incident light of all wavelengths.

5. The glasses-type device of claim 1, wherein the first reflection element is a half reflection mirror in which reflection of light is partially limited so that a transmission ratio and a reflection ratio of incident light having an unspecified wavelength have a predetermined ratio within a predetermined range.

6. The glasses-type device of claim 1, wherein the display part comprises:

an optical part including at least one light source configured to emit the image light; and a lens part including at least one lens for magnifying the image light emitted from the at least one light source and converting the image light into parallel light.

7. The glasses-type device of claim 6, wherein the at least one light source is a self-luminous light source or an illumination type light source including at least one of a micro light emitting diode (LED), a micro organic LED (OLED), a liquid crystal on silicon (LCoS), or a digital micromirror device (DMD) with LED or super luminescent diode (SLD).

8. The glasses-type device of claim 2, wherein the first reflection element is a holographic optical element arranged so that the light transmitted through the second holographic optical element is incident at an angle within a predetermined reflection angle range.

9. The glasses-type device of claim 1, further comprising:

a tilting portion configured to rotate the first reflection element by a predetermined angle to change an angle at which the reflective surface faces the second holographic optical element.

10. The glasses-type device of claim 9, wherein a position of the virtual image formed on a glass is moved in a direction towards a glabella of a user when the first reflection element is rotated to increase an incident angle of light incident on the second surface of the second holographic optical element, and wherein the position of the virtual image formed on the glass is moved in a direction towards a temple of the user when the first reflection element is rotated to decrease the incident angle of light incident on the second surface of the second holographic optical element.

11. The glasses-type device of claim 9, wherein the tilting portion further comprises an actuator configured to provide a rotational force for rotating the first reflection element by a predetermined angle, and wherein the glasses-type device further comprises:

at least one sensor configured to measure a distance between centers of pupils of both eyes of a user; and a controller configured to determine a rotation angle of the first reflection element at an angle corresponding to the distance measured by the at least one sensor, to control the actuator to rotate the first reflection element according to the rotation angle.

12. The glasses-type device of claim 11, wherein the at least one sensor includes at least one camera disposed in a frame supporting glass pieces corresponding to both eyes of the user, and wherein the controller is further configured to calculate the distance between the centers of pupils of both eyes of the user based on positions of the pupils of both eyes of the user obtained by the camera.

13. The glasses-type device of claim 11, wherein the at least one sensor includes at least one angle sensor configured to measure an angle between a body portion of the glasses-type device including the display part and a frame supporting glass pieces corresponding to both eyes of the user, and wherein the controller is further configured to estimate the distance between the centers of pupils of both eyes of the user based on the angle between the body portion including the display part and the frame supporting the glass pieces.

14. The glasses-type device of claim 1, further comprising:

a tilting portion configured to rotate the display part by a predetermined angle to change an angle at which the display part faces the diffraction element.

15. The glasses-type device of claim 14, wherein a position of the virtual image formed on a glass is moved in a direction towards a glabella of a user when the angle at which the display part faces the diffraction element is changed to increase an incident angle of light incident on the diffraction element, and wherein the position of the virtual image formed on the glass is moved in a direction towards a temple of the user when the angle at which the display part faces the diffraction element is changed to decrease the incident angle of light incident on the diffraction element.

16. A method of controlling a glasses-type device to provide a virtual image, the method comprising:

emitting, by at least one light source, image light serving as an image source of the virtual image;

magnifying and converting the image light emitted from the light source into parallel light by at least one lens;

reflecting and diffracting the parallel light at a predetermined angle by a diffraction element to generate positively dispersed light; and negatively dispersing the positively dispersed light by a first holographic optical element disposed on at least a portion of glass of the glasses-type device to generate light in which dispersion is canceled, and reflecting the light in which dispersion is canceled to an eye of a user for displaying the virtual image corresponding to the image light, wherein the reflecting and the diffracting include:

transmitting the parallel light incident at an angle within an predetermined incident angle range through a second holographic optical element and onto a reflective surface of a first reflection element;

reflecting the parallel light off of the first reflection element to output first reflected light at an angle within a predetermined reflection angle range, the first reflected light being based on the parallel light transmitted through the second holographic optical element; and reflecting, by the second holographic optical element, the first reflected light output from the first reflection element to output second reflected light towards the first holographic optical element, wherein the second reflected light is reflected and diffracted by the second holographic optical element to be positively dispersed.

17. The method of claim 16, wherein the diffraction element comprises:

the second holographic optical element configured to transmit light when the light is incident on the second holographic optical element at the angle within the predetermined incident angle range, and reflect light when the light is incident on the second holographic optical element at the angle within the predetermined reflection angle range; and the first reflection element arranged with the reflective surface of the first reflection element facing toward a second surface of the second holographic optical element at a predetermined angle.

18. The method of claim 17, wherein the reflecting and diffracting further comprises:

rotating a direction in which the at least one light source or the diffraction element is facing by a predetermined angle, and wherein a position of the virtual image formed on the portion of the glass is changed as the direction in which the at least one light source or the diffraction element is facing is changed.

* * * * *